(12) United States Patent
Krohn

(10) Patent No.: US 8,892,410 B2
(45) Date of Patent: Nov. 18, 2014

(54) ESTIMATION OF SOIL PROPERTIES USING WAVEFORMS OF SEISMIC SURFACE WAVES

(75) Inventor: Christine E. Krohn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 894 days.

(21) Appl. No.: 12/994,542

(22) PCT Filed: Jun. 19, 2009

(86) PCT No.: PCT/US2009/048007
§ 371 (c)(1),
(2), (4) Date: Nov. 24, 2010

(87) PCT Pub. No.: WO2010/019315
PCT Pub. Date: Feb. 18, 2010

(65) Prior Publication Data
US 2011/0120724 A1     May 26, 2011

Related U.S. Application Data

(60) Provisional application No. 61/087,933, filed on Aug. 11, 2008.

(51) Int. Cl.
*G06G 7/56*     (2006.01)
*G06G 7/48*     (2006.01)
*G01V 1/30*    (2006.01)

(52) U.S. Cl.
CPC ........................ *G01V 1/30* (2013.01)
USPC .............................. 703/5; 703/10

(58) Field of Classification Search
CPC ............ G06F 17/5018; G06F 2217/16; G06F 2217/80; G06F 17/5009; G06F 17/5036; E21B 49/00; E21B 43/00; G01V 11/00
USPC ...................................... 703/5, 10
See application file for complete search history.

(56) References Cited

U.S. PATENT DOCUMENTS

| 3,812,457 A | 5/1974 | Weller |
| 4,159,463 A | 6/1979 | Silverman |

(Continued)

FOREIGN PATENT DOCUMENTS

| EP | 1 094 338 | 4/2001 |
| EP | 1 746 443 | 1/2007 |

(Continued)

OTHER PUBLICATIONS

Akerberg, P., et al. (2008), "Simultaneous source separation by sparse radon transform," 78th Annual International Meeting, SEG, Expanded Abstracts, pp. 2801-2805.

(Continued)

*Primary Examiner* — Saif Alhija
(74) *Attorney, Agent, or Firm* — ExxonMobil Upstream Research Company Law Dept.

(57) ABSTRACT

A method for transforming seismic surface waves into depth profiles of dynamic properties of the soil such as the soil shear modulus or wave velocity or wave attenuation. The invention uses seismic data recorded preferably with a plurality of sources and receivers with a two-stage inversion approach. First, variations in surface-wave waveforms are decomposed (303) into surface-consistent transfer functions preferably for each source, each receiver, and each small region (301) of the surface. Then the transfer functions for each region are inverted (308) to determine soil properties or near-surface properties (such as the shear modulus) as a function of depth. The method can solve for the complex multi-mode nature of the surface waves for a media with both vertical and lateral changes in properties. Errors and limits in resolution for traditional methods from misidentification of ground roll modes or from assuming laterally uniform soil properties are avoided.

23 Claims, 13 Drawing Sheets

(56) References Cited

U.S. PATENT DOCUMENTS

| | | | |
|---|---|---|---|
| 4,168,485 A | 9/1979 | Payton et al. |
| 4,545,039 A | 10/1985 | Savit |
| 4,562,540 A | 12/1985 | Devaney |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,002,642 A * | 12/1999 | Krebs ............ 367/73 |
| 6,014,342 A | 1/2000 | Lazaratos |
| 6,021,094 A | 2/2000 | Ober et al. |
| 6,028,818 A | 2/2000 | Jeffryes |
| 6,049,759 A * | 4/2000 | Etgen ............ 702/14 |
| 6,058,073 A | 5/2000 | VerWest |
| 6,125,330 A | 9/2000 | Robertson et al. |
| 6,219,621 B1 | 4/2001 | Hornbostel |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,388,947 B1 | 5/2002 | Washbourne et al. |
| 6,480,790 B1 | 11/2002 | Calvert et al. |
| 6,522,973 B1 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,901,333 B2 | 5/2005 | Van Riel et al. |
| 6,903,999 B2 | 6/2005 | Curtis et al. |
| 6,944,546 B2 | 9/2005 | Xiao et al. |
| 6,947,843 B2 | 9/2005 | Fisher et al. |
| 6,999,880 B2 | 2/2006 | Lee |
| 7,046,581 B2 | 5/2006 | Calvert |
| 7,050,356 B2 | 5/2006 | Jeffryes |
| 7,072,767 B2 | 7/2006 | Routh et al. |
| 7,092,823 B2 | 8/2006 | Lailly et al. |
| 7,230,879 B2 | 6/2007 | Herkenoff et al. |
| 7,271,747 B2 | 9/2007 | Baraniuk et al. |
| 7,333,393 B2 * | 2/2008 | Vossen et al. .............. 367/47 |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,436,734 B2 | 10/2008 | Krohn |
| 7,480,206 B2 | 1/2009 | Hill |
| 7,502,690 B2 * | 3/2009 | Thomsen et al. .......... 702/2 |
| 7,584,056 B2 | 9/2009 | Koren |
| 7,602,670 B2 | 10/2009 | Jeffryes |
| 7,646,924 B2 | 1/2010 | Donoho |
| 7,672,194 B2 | 3/2010 | Jeffryes |
| 7,675,815 B2 | 3/2010 | Saenger et al. |
| 7,679,990 B2 | 3/2010 | Herkenhoff et al. |
| 7,715,985 B2 | 5/2010 | Van Manen et al. |
| 7,725,266 B2 | 5/2010 | Sirgue et al. |
| 7,796,468 B2 * | 9/2010 | Kellogg ............ 367/31 |
| 7,835,072 B2 | 11/2010 | Izumi |
| 7,840,625 B2 | 11/2010 | Candes et al. |
| 2002/0120429 A1 | 8/2002 | Ortoleva |
| 2002/0183980 A1 | 12/2002 | Guillaume |
| 2004/0073370 A1 * | 4/2004 | Dasgupta et al. .......... 702/6 |
| 2005/0007876 A1 * | 1/2005 | Castagna et al. .......... 367/38 |
| 2006/0133207 A1 * | 6/2006 | Vossen et al. ............ 367/47 |
| 2007/0274155 A1 * | 11/2007 | Ikelle ............ 367/38 |
| 2008/0175101 A1 | 7/2008 | Saenger et al. |
| 2008/0306692 A1 | 12/2008 | Singer et al. |
| 2009/0248308 A1 | 10/2009 | Luling |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0142316 A1 | 6/2010 | Keers et al. |

FOREIGN PATENT DOCUMENTS

| | | |
|---|---|---|
| GB | 2 390 712 | 1/2004 |
| GB | 2 391 665 | 2/2004 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |

OTHER PUBLICATIONS

Beasley, C. (2008), "A new look at marine simultaneous sources," *The Leading Edge* 27(7), pp. 914-917.

Beylkin, G. (1985), "Imaging of discontinuities in the inverse scattring problem by inversion of a causal generalized Radon transform," *J. Math. Phys.* 26, pp. 99-108.

Becquey, M. et al. (2002), "Pseudo-Random Coded Simultaneous Vibroseismics," SEG Int'l. Exposition and 72th Annl. Mtg., 4 pgs.

Berkhout, A.J. (1992), "Areal shot record technology," *Journal of Seismic Exploration* 1, pp. 251-264.

Berkhout, A.J. (2008), "Changing the mindset in seismic data acquisition," *The Leading Edge* 27(7), pp. 924-938.

Bonomi, E. et al. (2006), "Wavefield Migration plus Monte Carlo Imaging of 3D Prestack Seismic Data," *Geophysical Prospecting* 54, pp. 505-514.

Bunks, C., et al. (1995), "Multiscale seismic waveform inversion," *Geophysics* 60, pp. 1457-1473.

Chavent, G. et al. (1999), "An optimal true-amplitude least-squares prestack depth-migration operator," *Geophysics* 64(2), pp. 508-515.

Dziewonski A. et al. (1981), "Preliminary Reference Earth Model", *Phys. Earth Planet. Int.* 25(4), pp. 297-356.

Esmersoy, C. (1990), "Inversion of P and SV waves from multicomponent offset vertical seismic profiles", *Geophysics* 55(1), pp. 39-50.

Fallat, M.R. et al. (1999), "Geoacoustic inversion via local, global, and hybrid algorithms," *Journal of the Acoustical Society of America* 105, pp. 3219-3230.

Fichtner, A. et al. (2006), "The adjoint method in seismology I. Theory," *Physics of the Earth and Planetary Interiors* 157, pp. 86-104.

Ikelle, L.T. (2007), "Coding and decoding: Seismic data modeling, acquisition, and processing," 77th Annual Int'l. Meeting, SEG Expanded Abstracts, pp. 66-70.

(56) References Cited

OTHER PUBLICATIONS

Griewank, A. (1992), "Achieving logarithmic growth of temporal and spatial complexity in reverse automatic differentiation," 1 *Optimization Methods and Software*, pp. 35-54.

Griewank, A. et al. (2000), "Algorithm 799: An implementation of checkpointing for the reverse or adjoint mode of computational differentiation," 26 *ACM Transactions on Mathematical Software*, pp. 19-45.

Griewank, A. et al. (1996), "Algorithm 755: A package for the automatic differentiation of algorithms written in C/C++," *ACM Transactions on Mathematical Software* 22(2), pp. 131-167.

Jackson, D.R. et al. (1991), "Phase conjugation in underwater acoustics," *J. Acoust. Soc. Am.* 89(1), pp. 171-181.

Jing, X. et al. (2000), "Encoding multiple shot gathers in prestack migration," *SEG International Exposition and 70th Annual Meeting Expanded Abstracts*, pp. 786-789.

Kennett, B.L.N. (1991), "The removal of free surface interactions from three-component seismograms", *Geophys. J. Int.* 104, pp. 153-163.

Krebs, J.R. (2008), "Full-wavefield seismic inversion using encoded sources," *Geophysics* 74(6), pp. WCC177-WCC188.

Lecomte, I. (2008), "Resolution and illumination analyses in PSDM: A ray-based approach," The Leading Edge, pp. 650-663.

Levanon, N. (1988), "Radar Principles," Chpt. 1, John Whiley & Sons, New York, pp. 1-18.

Liao, Q. et al. (1995), "2.5D full-wavefield viscoacoustic inversion," *Geophysical Prospecting* 43, pp. 1043-1059.

Maharramov, M. et al. (2007) , "Localized image-difference wave-equation tomography," SEG Annual Meeting, *Expanded Abstracts*, pp. 3009-3013.

Marcinkovich, C. et al. (2003), "On the implementation of perfectly matched layers in a three-dimensional fourth-order velocity-stress finite difference scheme," *J. of Geophysical Research* 108(B5), 2276.

Mora, P. (1987), "Nonlinear two-dimensional elastic inversion of multi-offset seismic data," *Geophysics* 52, pp. 1211-1228.

Neelamani, R., (2008), "Simultaneous sourcing without compromise," 70th Annual Int'l. Conf. and Exh., EAGE, 5 pgs.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Rayleigh, J.W.S. (1899), "On the transmission of light through an atmosphere containing small particles in suspension, and on the origin of the blue of the sky," *Phil. Mag.* 47, pp. 375-384.

Romero, L.A. et al. (2000), Phase encoding of shot records in prestack migration, *Geophysics* 65, pp. 426-436.

Sheriff, R.E. et al. (1982), "*Exploration Seismology*", pp. 134-135.

Shin, C. et al. (2001), "Waveform inversion using a logarithmic wavefielcl," *Geophysics* 49, pp. 592-606.

Sirgue, L. (2004), "Efficient waveform inversion and imaging: A strategy for selecting temporal frequencies," *Geophysics* 69, pp. 231-248.

Spitz, S. (2008), "Simultaneous source separation: a prediction-subtraction approach," 78th Annual Int'l. Meeting, *SEG Expanded Abstracts*, pp. 2811-2815.

Stefani, J. (2007), "Acquisition using simultaneous sources," 69th Annual Conf. and Exh., *EAGE Extended Abstracts*, 5 pgs.

Symes, W.W. (2007), Reverse time migration with optimal checkpointing, *Geophysics* 72(5), pp. P.SM213-SM221.

Tarantola, A. (1984), "Inversion of seismic reflection data in the acoustic approximation," *Geophysics* 49, pp. 1259-1266.

Tarantola, A. (1988), "Theoretical background for the inversion of seismic waveforms, including elasticity and attenuation," *Pure and Applied Geophysics* 128, pp. 365-399.

van Manen, D.J. (2005), "Making wave by time reversal," SEG International Exposition and 75th Annual Meeting, *Expanded Abstracts*, pp. 1763-1766.

Weglein, A.B. (2003), "Inverse scattering series and seismic exploration," *Inverse Problems* 19, pp. R27-R83.

Vigh, D. et al. (2008), "3D prestack plane-wave, full-waveform inversion," *Geophysics* 73(5), pp. VE135-VE144.

Zhang, Y. (2005), "Delayed-shot 3D depth migration," *Geophysics* 70, pp. E21-E28.

\* cited by examiner

ESTIMATION OF SOIL PROPERTIES USING WAVEFORMS OF SEISMIC SURFACE WAVES

CROSS REFERENCE TO RELATED APPLICATIONS

This application is the National Stage entry under 35 U.S.C. 371 of PCT/US2009/048007 that published as WO 2010/019315 and was filed on 19 Jun. 2009, which claims the benefit of U.S. Provisional Application No. 61/087,933, filed on 11 Aug. 2008, each of which is incorporated by reference, in its entirety, for all purposes.

FIELD OF THE INVENTION

This invention relates generally to the field of geophysical prospecting, and more particularly to seismic data processing. Specifically, the invention is a method for inverting seismic surface wave data to obtain the elastic properties of the soil, such as the soil shear wave velocity or shear modulus or shear wave attenuation. In particular, the elastic properties as a function of depth from the surface or a depth profile of the properties can be obtained. The method can also be used to estimate the location of anomalies within the soil such as voids or buried objects.

BACKGROUND OF THE INVENTION

Seismic surface waves, also termed ground-roll or Rayleigh waves or Love waves, are confined to a region near the surface of the earth, and thus their propagation is dependent on the near surface elastic properties, particularly the shear-wave velocity as a function of depth from the surface. The shear-wave velocity is directly related to the stiffness of the soil as given by the soil shear-modulus. (The shear-wave velocity is the square root of the shear modulus divided by the density.) The shear wave velocity or shear modulus profile and other elastic characterization of the soil can be used directly for engineering or other purposes or can be used indirectly to improve geophysical prospecting below the soil or near-surface region. In addition to the shear modulus or wave velocity, the elastic attenuation or amplitude decay with distance is also useful information that can be used for both engineering and geophysical prospecting.

The soil shear wave velocity or modulus can be determined by inverting ground-roll dispersion (phase-velocity versus frequency) curves to obtain the earth's shear-wave velocity profile. Because of compaction effects, velocities are generally slower near the surface of the earth and increase with depth. Higher frequency components of the surface waves are confined near the surface and sample the slower soil layers. On the other hand, lower frequency components sample deeper, faster layers. Thus, the velocity of the surface wave changes with frequency, i.e. it is dispersive. In particular the velocity decreases with increasing frequency. The shape of the dispersion curve as a function of frequency can be compared to computed dispersion curves calculated for a layered velocity profile, and then the profile properties, i.e. layer thickness and shear modulus, can be updated to better match the measured dispersion curves. Layering causes resonance effects and the trapping of different modes of the ground roll. More precision can be obtained by inverting the dispersion curves for both the fundamental and higher-order modes of the ground roll.

After surface waves are transformed into depth profiles of the soil shear-wave velocity or shear modulus, shear wave attenuation or other property, the information can be used directly as an important engineering parameter for designing structures such as buildings and bridges. Other applications for the direct use of surface waves for near-surface characterization include estimating the earthquake site response, soil compaction control, mapping the shallow surface, estimating the strength of subsurface materials, pavement evaluation, finding buried cultural features or anomalies, evaluating voids around sewers, and finding the depth to bedrock. The near-surface velocity profiles can be used indirectly to improve the determination of the physical structure or physical property of deeper subsurface regions for hydrocarbon assessment or extraction. Because the near-surface, has low velocity and is heterogeneous, it has a large effect on seismic waves that pass through it and can limit the ability to determine the structure and properties of deep regions. The near-surface velocity profile can be used to make time corrections or static corrections for the seismic reflections from deeper zones or the velocity information can be used for imaging, migration or for inversion of the seismic data.

A problem with all prior art methods that utilize surface waves, Rayleigh waves or Love waves is that it is difficult to resolve or distinguish different dispersion curves for different surface-wave modes. One inherent difficulty arises from frequency and velocity uncertainty, and the inversion is compromised when the wrong mode is identified or incorrectly picked. A second difficulty arises from lack of knowledge about the source phase and uncertainties in changes in phase over $2\pi$. In addition, all such methods average the surface-wave properties over the receiver spread distance used in the analysis, and this averaging limits resolution. Finally, the interference between modes and noise and the attenuation of surface waves can distort the seismic amplitudes making identification of individual dispersion curves difficult. Next, traditional methods for determining soil shear modulus or shear wave velocity are discussed in somewhat more detail.

Current methods to use surface waves for characterizing the soil shear modulus or wave velocity involve the acquisition of seismic data followed by two processing stages: (1) the measurement of dispersion curves as a function of frequency and (2) then the inversion of the dispersion curves to obtain the shear modulus as a function of depth. Similar methods may be used separately to derive properties other than the shear modulus such as attenuation properties. The methods to measure the dispersion curves differ largely in the number of sources and the number of receivers acquired. The earliest methods used one source and a single pair of receivers. Newer methods use one source and multiple receivers (on the order of 20 or more) spaced at regular intervals. Most methods use a compression source, which generate Rayleigh waves, but shear sources can also be used to generate Love waves. The method to use either wave type is the same.

Stage 1: Methods for a Pair of Receivers

The earliest uses of Rayleigh waves for characterizing the soil shear modulus are "steady state methods" involving use of a seismic vibrator to vibrate the earth with a single frequency or with a slowly varying frequency (U.S. Pat. No. 3,864,667 to Bahjat (1975)). At each frequency, the phase difference between the responses of two geophones is measured. From these measurements, the properties of the near surface between the receivers are inferred. Such measurements, however, take a long time to acquire. In the 1980's, the SASW (Spectral Analysis of Surface Waves) method was developed (Nazarian et al., "Use of spectral analysis of surface waves method for determination of moduli and thickness of pavement systems," *Transport. Res. Record* 930, 38-45 (1983)). The method determines the dispersion curve by first calculating a cross power spectrum between the signals recorded by the two sensors and then unwrapping the phase.

Both the SASW method and the steady state method suffer from similar problems. Because only a pair of receivers is used at a time, it is hard to distinguish between the effects of the different surface wave modes and the effects of any recorded noise. The distance between the receivers and between the pair of receivers and the source are varied to minimize, but not eliminate, the effects of the higher order modes. An inherent problem with these measurements is ambiguity around factors of $2\pi$ in phase. The receivers must be close enough together so that the phase does not change by more than $2\pi$. It is important to be able to distinguish between a phase change of $\Delta$ and a change of $\Delta+2\pi$; the latter corresponds to a slower velocity. Sometimes, a few additional receivers are used to assist in phase unwrapping.

More recently, use has been made of the Wavelet Transform as a method to allow an improved isolation of a single ground-roll mode and to minimize the contributions from other modes as explained by Holschneider et al. in "Characterization of dispersive surface waves using continuous wavelet transforms," *Geophys. J. Int.* 163, 463-478 (2005). The wavelet transform is a time-frequency transform that can allow better localization of the individual modes. The method reduces interference between modes, but noise is still a problem as is the $2\pi$ ambiguity in phase. Holschneider, et al. constructs a mathematical model of the surface-wave propagation effects in the wavelet transform domain and uses it to solve first for dispersion curves and then for attenuation curves for one mode at a time.

Stage 1: Multiple Receivers

The Multichannel Analysis of Surface Wave method (MASW) was developed by the Kansas Geological Survey. In this method 20-65 or more receivers are deployed and data recorded from one impulsive or vibratory source. (Park et al., "Multichannel analysis of surface waves," *Geophysics* 64, 800-808 (1999); and Park et al., "Multichannel analysis of surface waves (MASW) active and passive methods," *The Leading Edge* 26, 60-64 (2007)). The data are processed as a single shot gather, the amplitudes are normalized or scaled, and then are transformed to the frequency wavenumber (f–k) domain or to the frequency slowness (f–p) domain. The dispersion curves for one or more modes are then picked at the points of maximum amplitudes in the f–k or f–p domains. The dispersion curves for one or more modes are used in the subsequent inversion of near-surface properties (Beaty et al., "Repeatability of multimode Rayleigh-wave dispersion studies," *Geophyics* 68 782-790 (2003)). The acquisition may be repeated with each new shot fired into a new receiver spread, and each shot gather separately analyzed to obtain the 1D near-surface velocity profile for each spread. Each 1D profile is then combined with an interpolation scheme to generate a 2D profile of the near surface.

The multichannel method is an improvement over the SASW method. One advantage is that the use of closely spaced receivers minimizes the $2\pi$ ambiguity of phase changes; however, it is impossible to estimate the source phase from a single gather (Hermann and Ammon, "Surface Waves, Receiver Functions, and Crustal Structure: Version 3.3," in Computer Programs in Seismology, Saint Louis University, http:www.eas.slu.edu/People/RBHermann/CPS330.htl. (2004)). Its second advantage is that the transformation to f–k or f–p domains inherently involves a sum or stack over the traces, which improves frequency resolution and reduces problems with noise. However, the trade-off is a loss in lateral resolution; it is impossible to detect changes in velocity within the width of the spread. As in the two channel case, it is also important to pick the offset range to emphasize or deemphasize various modes (Xia et al., "Utilization of high-frequency Rayleigh waves in near-surface geophysics," *The Leading Edge* 23, 753-759 (2004)). In addition, the receivers must be uniformly spaced close together to not alias the ground roll. Furthermore because the ground-roll amplitudes are heavily attenuated, they vary from trace to trace, and the sum distorts the amplitudes. Normalization or amplitude balancing is used, but it is still difficult to pick and distinguish multiple interfering ground roll modes. Lefebvre and Benhassen (U.S. Patent Application Pub. No. 2005/0143924 A1) teach use of the wavelet transform to improve the ability to distinguish different modes. Forbriger ("Inversion of shallow-seismic wavefields: I. Wavefield transformation," *Geophys. J. Int.* 153, 719-734 (2003)) illustrates difficulties in picking multimodal dispersion curves and problems with the subsequent inversion when the dispersion curves are incorrectly picked or misidentified. Both Forbridger and Ryden and Park ("Fast simulated annealing inversion of surface waves on pavement using phase-velocity spectra," *Geophysics* 71, R49-R58 (2006)) avoid picking dispersion curves and instead invert the f–p transform results directly. These methods involve a mathematical model of surface-wave propagation in the f–p domain, which involves several assumptions and approximations.

Stage 1: Multiple Receivers and Multiple Sources

The simultaneous use of multiple source locations and multiple receivers to obtain laterally varying phase velocity curves is discussed by Ernst et al. in "Tomography of dispersive media," *J. Acoust. Soc. Am.* 108, 105-115 (2000) and in "Removal of scattered guided waves from seismic data," *Geophysics* 67, 1240-1248 (2002). The application is not for near-surface characterization, but instead for mitigation of scattered ground-roll for oil exploration seismic applications. Their process includes a cascade of operations. They first invert for a laterally changing phase velocity as a function of frequency using a tomography method based on generalized travel times. They assume that lateral changes are small and that they can obtain isolation of one mode in a time window. This latter assumption requires that the source and receivers are sufficiently far apart that the modes are well separated in time, but because of the strong attenuation of surface wave modes, this is difficult or impossible to achieve with data acquired for near-surface characterization. The use of generalized traveltimes involves computation of the derivative of the phase of the data, and problems of phase ambiguity in the determination of ground-roll phase velocity are increased.

Stage 1: Attenuation Versus Frequency Curves

While most of the prior art concentrates on phase-velocity dispersion curves, the use of attenuation curves as a function of frequency is discussed by Xia et al. (op. cit.). The quality factor (Q) as a function of depth along with the shear modulus is also an important engineering quantity, but the inversion of data for attenuation has less stability. Generally, the assumption is made that attenuation is independent of frequency (Ernst et al., "Removal of scattered guided waves from seismic data," *Geophysics* 67, 1240-1248 (2002); and Kulesh et al., "Modeling of Wave Dispersion Using Continuous Wavelet Transforms II: Wavelet Based Frequency-Velocity Analysis," *Pure & Applied Geophysics* 165, 255-270 (2008)). However, for surface waves of use for near-surface characterization, this assumption is limiting. Because the attenuation typically decreases for increasing soil depth, the attenuation of surface waves must also decrease as a function of frequency in the same manner that the phase velocity is dispersive.

Stage 2: Inversion of Dispersion Curves for Near-Surface Velocity Profiles

There are a number of algorithms available to solve for the near-surface velocity profile from dispersion curves, but the success of all such methods depend on the accuracy of the input dispersion curves. The inversion is a nonlinear model optimization problem in which the model is the near-surface velocity profile. Parameters include layer depths and layer shear modulus. The algorithms include linearized least squares inversion, Levenberg Marquardt, quasi-Newton, and more recently simulated annealing (Beaty et al., "Simulated annealing inversion of multimode Rayleigh wave dispersion curves for geological structure," *Geophys. J. Int.* 151, 622-631 (2002)). Available software include freeware (Hermann and Ammon, "Surface Waves, Receiver Functions, and Crustal Structure: Version 3.3," in Computer Programs in Seismology, Saint Louis University, http:www.eas.slu.edu/People/RBHermann/CPS330.htl. (2004)), and commercial software (SeisOpt® ReMi™, http:www.optimsoftware.com; and Kansas Geological Survey: http:/www.kgs.ku.edu/software/surfseis./index.html.).

There remains a need for an improved method for transforming surface waves into depth profiles of near-surface properties by attaining high resolution, laterally varying, multi-mode dispersion and attenuation curves for input into near-surface characterization inversion. In particular, the method should minimize ambiguities in the source phase. The present invention satisfies this need.

SUMMARY OF THE INVENTION

In one embodiment, the invention is a method for estimating shear modulus, shear wave velocity, shear wave attenuation, or another physical property of a near-surface region of the earth from seismic data traces corresponding to at least one source position and a plurality of receiver positions in a seismic survey of the region, comprising:

(a) dividing the near surface region into one or more cells;

(b) for each trace and corresponding seismic source and receiver locations, computing the raypath distance across each intervening cell from the source location to the receiver location;

(c) for each trace, simultaneously solving for at least two surface-consistent components each of which characterizes either filtering effects of propagation of seismic surface waves across a cell, or coupling of the corresponding seismic source or receiver to the earth, wherein said solution iteratively optimizes the components by comparing a predicted surface wave, calculated using assumed or iteratively updated components along with raypath information from (b), with a corresponding data trace from the survey;

(d) choosing one or more of the surface consistent components, and using them to compute by numerical inversion the shear modulus or another property of the near-surface region.

BRIEF DESCRIPTION OF THE DRAWINGS

The present invention and its advantages will be better understood by referring to the following detailed description and the attached drawings in which.

The invention will be described in connection with example embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present invention is a method to obtain velocity dispersion and attenuation curves as a function of frequency for surface waves from seismic data. Preferably the data are recorded using multiple sources and multiple receivers. The curves or their modifications can then be used to invert for near-surface properties such as shear wave velocity or shear modulus or shear wave attenuation as a function of depth by known numerical techniques. Model optimization and data redundancy are used to solve for the surface-consistent model parameters that best represent the recorded seismic data waveforms and changes in the waveform as the surface waves propagate along the earth's surface from the sources to the receivers. The parameters relate to individual components or filter transfer functions for each source location, each receiver location, and propagation through each region of the surface. The model parameters may include multiple modes of the surface-wave and surface-consistent lateral variations.

Thus, the invention uses seismic data recorded preferably with a plurality of sources and receivers with a two-stage inversion approach. In Stage 1, variations in surface-wave waveforms are decomposed into surface-consistent transfer functions preferably for each source, each receiver, and each small region of the surface. Subsequently, in Stage 2, the transfer functions for each region are inverted to determine soil properties or near-surface properties (such as the shear wave velocity) as a function of depth. The method can solve for the complex multi-mode nature of the surface waves for a media with both vertical and lateral changes in properties. Errors and limits in resolution for traditional methods from misidentification of ground roll modes or from assuming laterally uniform soil properties are avoided.

Seismic Data Acquisition

Figure 1A:
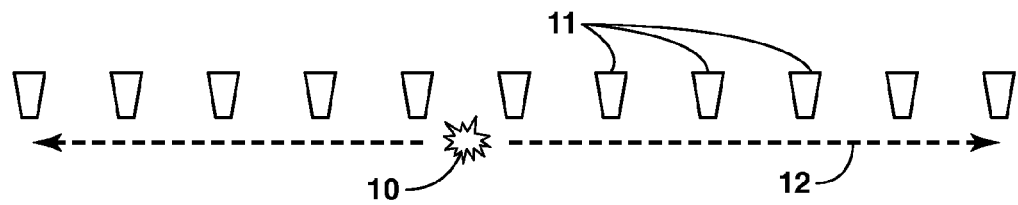
FIGS. 1A-B illustrate acquisition of seismic data using multiple receivers for both linear (1A) and areal (1B) applications.
Figure 1B:
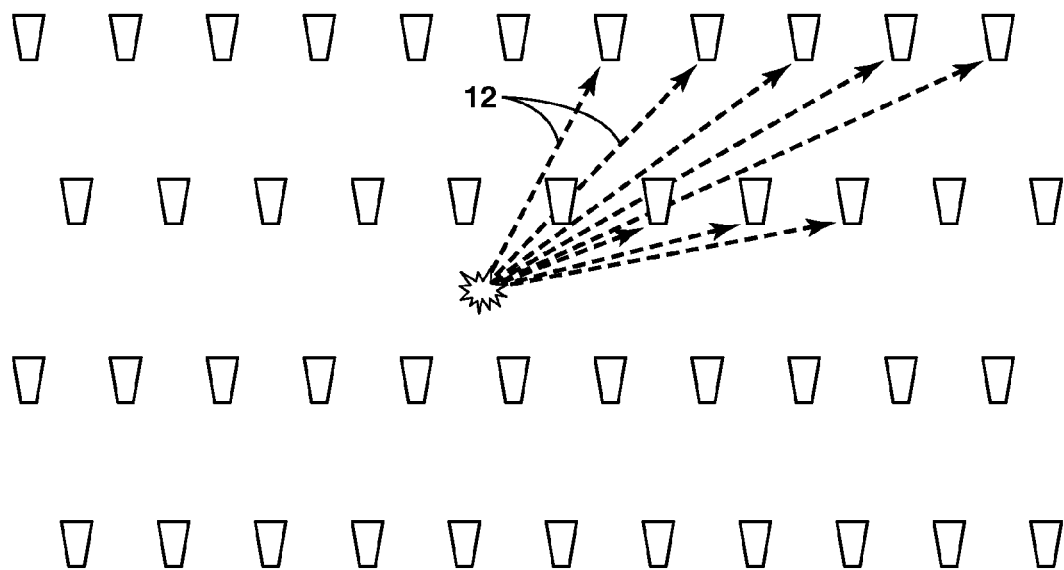
Figure 2A:
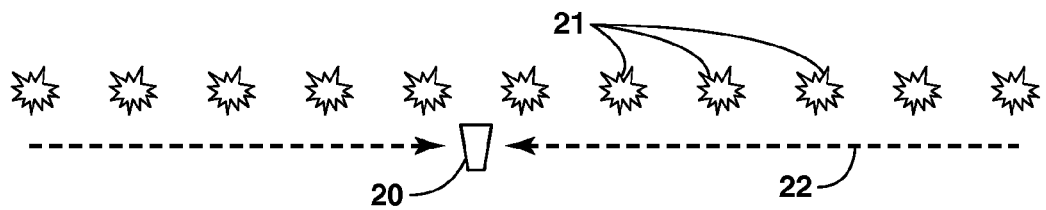
FIGS. 2A-B illustrate acquisition of seismic data using multiple sources for both linear (2A) and areal (2B) applications.
Figure 2B:
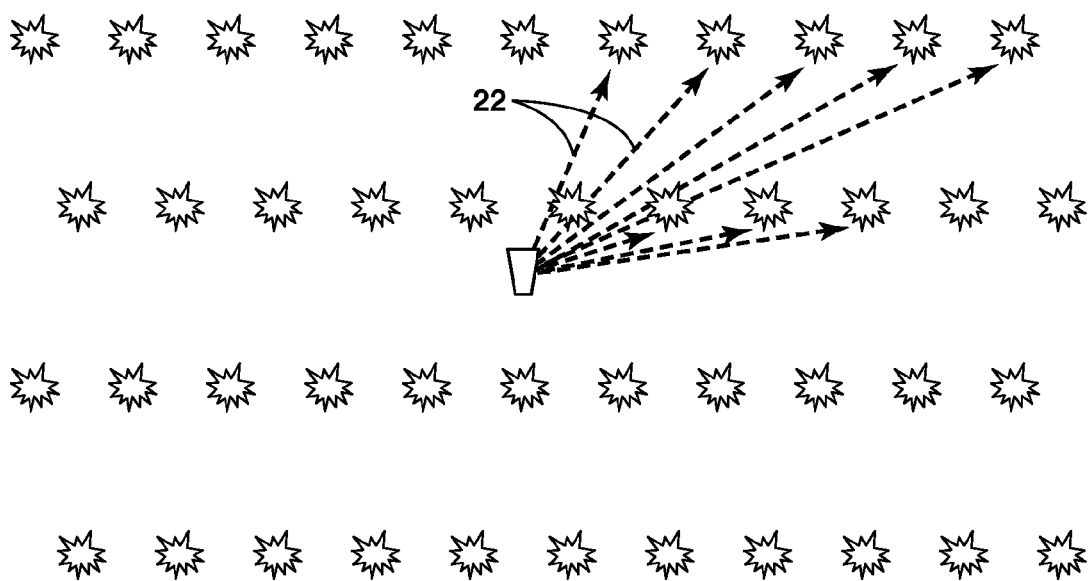

First seismic data must be recorded or obtained. Seismic data recorded for other purposes, for example to image the subsurface, can typically be used—see the discussion of preferred acquisition parameters below. If such data are not available, then a special survey to obtain the surface-wave properties should be acquired. If near-surface information is needed only along a line of the surface, then data can be recorded with sources and receivers along the line as in standard 2D seismic recording. If areal information is needed, then the sources and receivers should be spread out over the area with both sources and receivers spanning the area to be investigated. As with any seismic acquisition, the source and receiver locations must be surveyed and must be available along with the recorded data trace. Any type of seismic source can be used, such as dynamite, vibrators, air guns, weight drop, hammer blows, seismic guns, etc. Preferably sources should be fired into multiple receivers (e.g. ten or more) as shown for in FIGS. 1A-B for linear (FIG. 1A) and areal acquisition (FIG. 1B). In FIG. 1A, one source (10) and a number of receivers (11) are displayed. It is understood that there is a direct raypath (12) between the source and each receiver. Only a few of the possible raypaths are drawn in FIG. 1. The distance between a source and receiver is called the offset. Conversely, over time as the source is moved to different locations, each receiver (20) should record data from multiple shots (21) (preferably ten or more) with different raypaths (22) as shown in FIGS. 2A and 2B. These two requirements are most easily accomplished by laying out a receiver spread of a number of receivers (60-1000) and then firing sources, one after the other, into the whole spread. The number of shots does not need to be the same as the number of receivers. To reduce the cost, the number of shots can be much less than the number of receivers, or vice versa. If the available instruments can record only a limited number of channels, then recording can be limited to the receivers within a maximum (maximum offset) distance from each source.

Figure 3A:
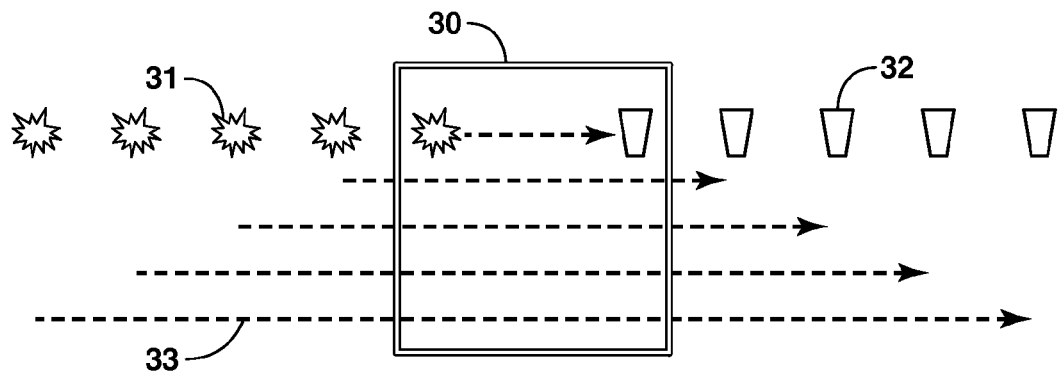
FIGS. 3A-B illustrate acquisition of seismic data using multiple source-receiver pairs with different offsets spanning a region of the surface for both linear (3A) and areal (3B) applications.
Figure 3B:
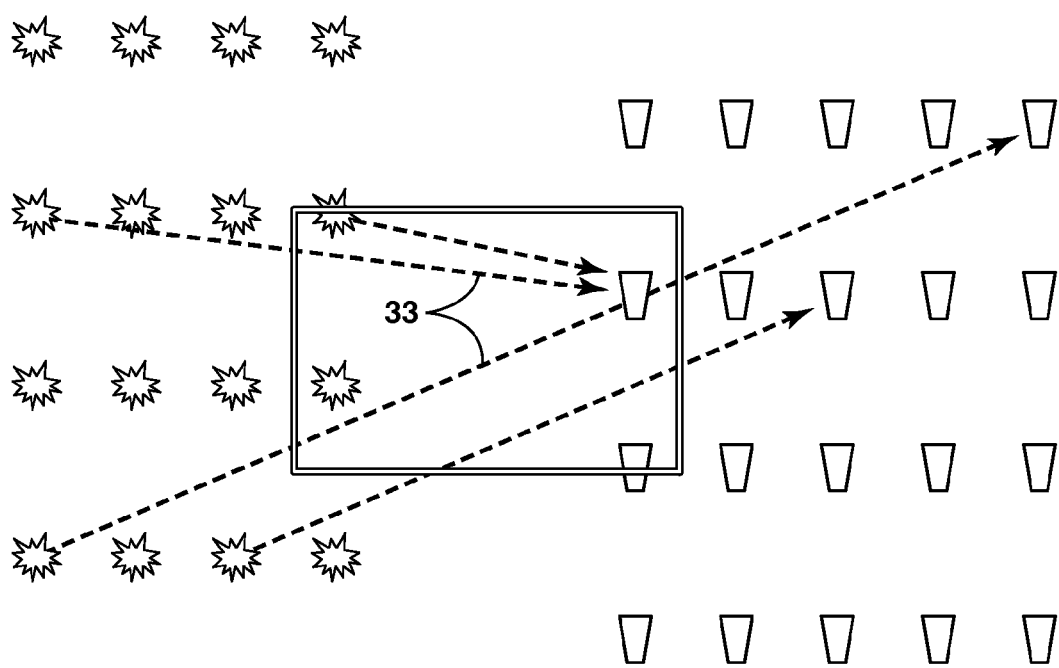

It is also preferable that the sources and receivers be arranged so that multiple source-receiver raypaths (preferably 10-20 or more) pass through each region to be investigated with different offsets ranging from a specified minimum offset to a specified maximum offset. In FIG. 3A, a region is shown by the box 30. The drawing shows some of the raypaths (33) that pass through box 30 from a source such as 31 to a receiver such as 32. There are a number of such raypaths (not all are shown) with a variety of offsets. FIG. 3B illustrates the same features in an areal survey. The minimum offset should be long enough to result in plane-wave propagation, which is established at a distance of approximately ½ of a surface-wave wavelength. This distance is approximately equal to the depth of penetration. The maximum offset is preferably short enough to avoid excessive attenuation of the surface waves. Typically it is 2-3 times the minimum offset. Shorter and longer offset distances can be recorded. The receiver spacing should preferably be no greater than the size of the desired lateral resolution, but it may be useful to have half that sampling if possible. The sources and receivers may be laid out on a regular grid, or an irregular grid or pseudo random sampling may be used. It may be necessary to design a survey to make use of roads to place sources and to avoid structures. It may also be useful to place sources and receivers outside of the desired area to be covered to make sure there is sufficient data redundancy at the edges.

To optimize the survey parameters, such as the minimum offset, maximum offset, and receiver and source sampling, it is useful to have information about the area. It may be helpful to do some preliminary testing to determine the frequency range of the source and the velocity range of the ground roll. This will allow the computation of surface-wave wavelengths. It may also be useful to record in the middle of the area, a shot into a 2-D line with fine receiver sampling so that f–k or f–p analysis can be used to derive initial parameters. For this special line, the receiver sampling (i.e. spacing) should be less than the maximum frequency multiplied by the slowest velocity so the data are not aliased.

Stage 1: Model Optimization

Figure 4:
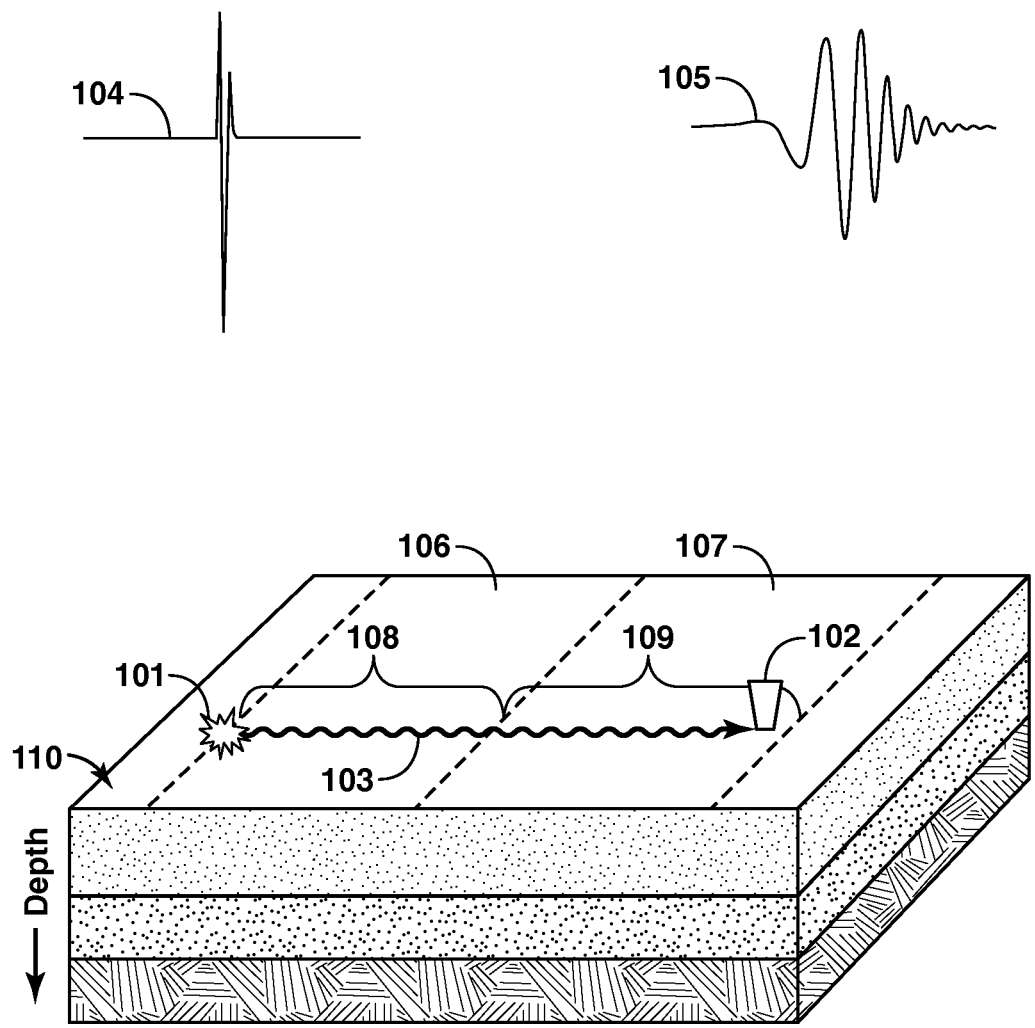
FIG. 4 is an illustration of the physical processes that affect the waveform as surface waves propagate from a source to receiver along the surface of the earth.

One characteristic, besides ray path differences, that distinguishes surface waves from other seismic waves (such as down-going waves that reflect from interfaces) is their waveform. The waveforms of surface waves are high amplitude, low-frequency, and oscillating. On the other hand, the source wavelet is a typically high-frequency pulse or wavelet of short duration. The physical processes for this change in waveform are illustrated in FIG. 4, which shows a piece of a layered earth 110. As a mode of the surface wave propagates from a source located at the surface position 101 to a receiver located at the surface position 102 along the surface of the earth (raypath 103), it undergoes considerable earth filtering, changing from the short duration pulse of the source (104) to the more oscillatory low-frequency waveform of the surface wave (105). The surface wave is delayed and attenuated. The further the distance of propagation (103) the greater is the change. Given an estimate of the source waveform (104) and the recorded output (105), this change can be quantified by computing a transfer function for each trace. This may be called the total trace transfer function, and it characterizes the total earth filtering that results in the change of the waveform from that generated at the source to that recorded at the geophone.

Filters are commonly characterized by their transfer functions or their impulse responses. The transfer function is defined as the division in the frequency domain of the output of the filter by the input of the filter: For the seismic acquisition in FIG. 4, the transfer function T(f) is $$T(f) = \frac{\text{output}(f)}{\text{input}(f)} = \frac{D(f)}{S(f)}, \tag{1}$$

where D(f) is the Fourier transform of the data trace 105 and S(f) is the Fourier transform of the source wavelet 104. Equivalently, the transfer function can be obtained by cross correlating the wavelet and the data trace and dividing by the autocorrelation of the source wavelet.

$$T(f) = \frac{S^*(f)D(f)}{S^*(f)S(f)}, \quad (2)$$

where the asterisk indicates the complex conjugate. The transfer function is complex; it must include both amplitude and phase or real and imaginary parts to fully characterize the filtering effects. Computing the inverse Fourier transform yields the impulse response of the filter. The transfer function and the impulse response are equivalent characterizations in the frequency and time domains, respectively.

It is well known that individual linear filters can be convolved together (or multiplied together in the frequency domain) to yield a combined filter. It can be seen in FIG. 4, that the overall effect on the waveform of the surface-wave is composed of different physical processes, each associated with a surface location or region. For example, the coupling of the source energy into a ground-roll mode at position 101, propagation across region 106, propagation across region 107, and coupling of the receiver to the ground at position 102. Furthermore, the filtering from propagation across region 106 should be a function of the distance traveled (108) across region 106 and the filtering from propagation across region 107 should be a function of the distance traveled (109) across region 107. The filtering for propagation effect includes the effect of delay or velocity as a function of frequency (dispersion) and amplitude decay as a function of frequency. Thus for the one surface-wave mode, the overall trace transfer function T(f) can be decomposed into individual transfer functions or filters for each of the above physical processes, or $$T(f)=T_{101}(f)T_{106}(f,d_{108})T_{107}(f,d_{109})T_{102}(f). \quad (3)$$

Using Equations 1 and 3, a model expression M(f) can be derived that represents the recorded ground-roll waveform:

$$M(f)=S(f)T_{101}(f)T_{106}(f,d_{108})T_{107}(f,d_{109})T_{102}(f) \quad (4)$$

Equation 4 is a model of the waveform for a single ground-roll mode. It is further assumed that the data are composed of a linear superposition of multiple modes. Also, it is assumed initially that the individual modes do not interact or are coupled. Therefore for N modes, a model of the complex ground-roll waveform can be represented as $$M(f) = S(f)\sum_{j=1}^{N} T_{101,j}(f)T_{106,j}(f, d_{108})T_{107,j}(f, d_{109}), T_{102,j}(f), \quad (5)$$

where the sum is over all different modes j=1 to N. The number of modes N is typically small, on the order of 2-6.

In Equation 5, the individual physical processes are represented as transfer functions or filters in the frequency domain. Preferably all such filters are included, even though only propagation effects are needed to solve for near-surface properties. The transfer functions are complex, and include both amplitude and phase or real and imaginary parts as function of frequency. For propagation, this includes both velocity and attenuation effects. A number of different processes can be included in a model expression. Some of these are known or can be measured. For example, one filter is that of the recording system. The impulse response of the recording system can be measured by one skilled in the art. Another might be the instrument response of the sensors, which can be obtained from the manufacturers. A third is the amplitude spreading function, which is known to be inversely proportional to the square root of the total source to receiver distance for each trace. It may be useful to lump several related processes into one term. For example, if there is a receiver array, the array effects could be lumped with a term for receiver coupling. In both cases, they are related to a specific receiver surface location. Also it may be useful to include one term that can be assumed to be known, and then have a second variable correction term. For example, an average source wavelet could be estimated, and then the source coupling term could include both coupling and shot-to-shot variations of the wavelet.

Figure 5:
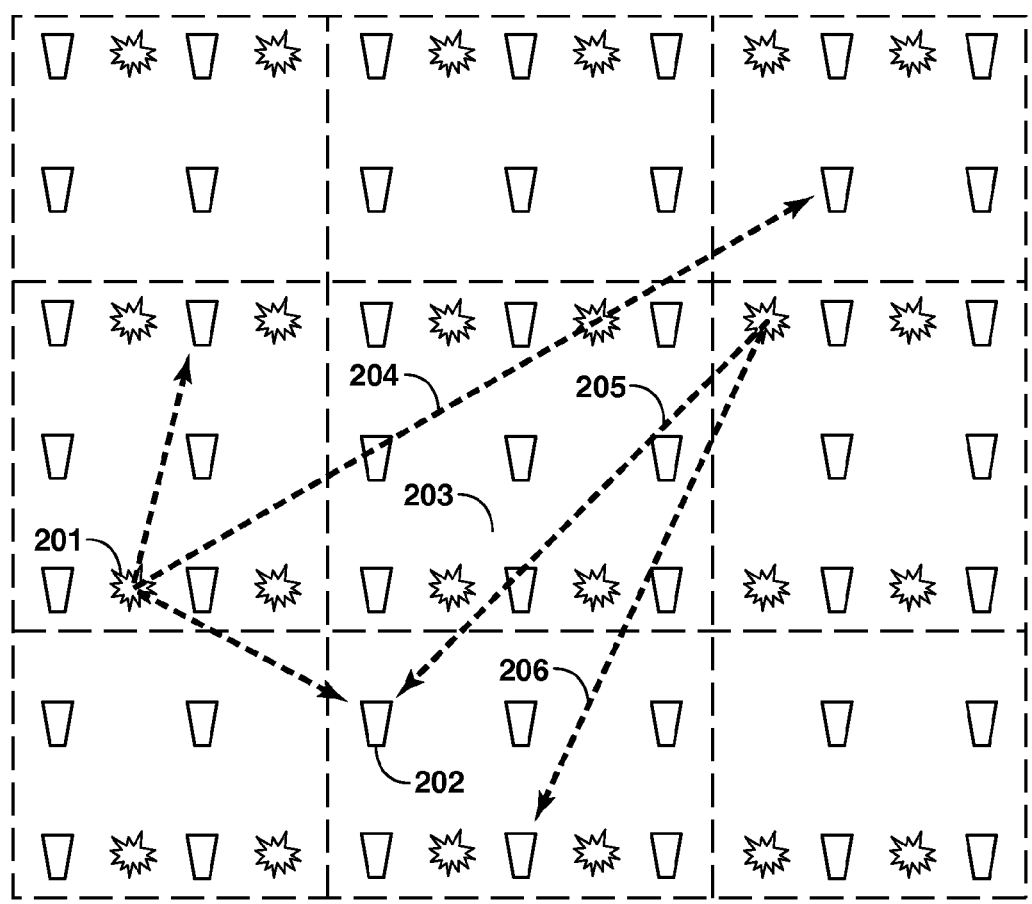
FIG. 5 is a diagram of a small part of a seismic survey in map view showing the location of sources and receivers and the division into regions or cells, and showing example raypaths from sources to receivers across different regions.

For a linear or areal survey, the present invention uses the redundancy of data traces, which have different raypaths and source-receiver distances, to decompose overall changes in ground-roll waveform into the individual surface-consistent components or filters that represent the individual physical processes. This use of data redundancy is illustrated with FIG. 5 for areal data. FIG. 5 shows a small section of a possible seismic survey in map view. In the section shown, there is a source, whose surface location is labeled 201. The source may actually be located below the surface in a shot hole. In the diagram, there are 24 such sources, each indicated by a sun burst symbol. There are also 49 receivers marked by a trapezoid symbol, one of which is labeled 202. Assuming that recordings are made for each receiver each time a source is fired, then 24×49 or 1176 data traces are available. For this invention, the survey area is divided into regions, or cells. In this case, dashed lines show rectangular cells and the central one in the drawing is labeled 203. Each source and receiver pair is connected by a raypath, which on first approximation can be considered a straight line. Only a few example raypaths are shown, such as 204, 205 and 206, and these three each sample region 203 with different travel distances. Assuming only one mode of surface-wave, then at each frequency the data traces in the frequency domain can be used to solve for the unknown component surface-consistent transfer functions. In this example for one mode, the unknowns include the 24 source coupling terms, 49 receiver coupling terms, and 9 propagation terms (because there are 9 discrete cells), a total of 82 unknowns. (This illustrates the optimization in step 303 of FIG. 6, which is discussed below.) Since there are 1176 pieces of data and 82 unknowns, the problem is over determined. If there are two modes, then there could be 164 unknowns. It is a key part of this invention that the different unknowns related to different physical processes are determined simultaneously. There are 49 traces that have information about the source at 201, there are 24 traces that have information about receiver 202 and there are at least 460 raypaths across region 203, each of which will be weighted by a different path length across region 203. Those experienced in the art will recognize this problem as a 2D straight-ray tomography problem for the surface.

The present inventive method preferably uses a model expression with parameters that characterize the effects of the important physical processes and a cost function that indicates the goodness of fit between the data and the model expression. It is helpful to include as many known effects, i.e. the recording system instrument response, as possible. Some components may not be important for a particular acquisition and could be neglected. For example, if single receivers are used and they are generally well coupled to the ground, coupling may be neglected or replaced with a simple scalar. At a minimum the parameters should be at least two in number, for example a term for propagation through one region and a source term for energy partition into a ground-roll mode. The cost function for a least-squared optimization (for example) is the sum over the number of traces of the square of the difference between the actual data and the model expression for each trace. The sum is over all the data traces used in solving for the parameters. The cost function can be expressed in the frequency domain, in the time domain, or in some transform domain, including for example f–k, radon, wavelet, Gabor, complex trace, Hilbert, and others that skilled practitioners will know of. Also a filter can be applied such as a cross-correlation filter to both the data and the model. In addition, the seismic recordings can be processed with interferometric methods from either active or passive sources. Preferably, the frequency domain is used and the cost function is related to the differences between both real and imaginary representations, i.e. the amplitude and phase representations of the data and model expression. An example cost function (for step 303) using real and imaginary parts is $$\min = \sum_{i=1}^{Ntrace} \left[\left|\text{real}(D_i(f, sx, sy, rx, ry)) - \text{real}(M_1(f, sx, sy, rx, ry, \vec{T}))\right|^2\right] + \sum_{i=1}^{Ntrace} \left[\left|\text{imag}(D_i(f, sx, xy)) - \text{imag}(M_i(f, sx, sy, rx, ry, \vec{T}))\right|^2\right], \quad (6)$$

where the symbol $\vec{T}$ is a vector composed of all the individual component transfer functions $(T_1(f), T_2(f), T_3(f),$ etc.). The vector values $\vec{T}$ are determined by minimizing the square of the differences between the model trace $M_i(f, \vec{T})$ and the data trace $D_i(f)$ summed over the number of traces $N_{traces}$. Equation 5 uses a power of 2 for the differences, which is a least squares optimization problem, but other powers, called norms, may be used such as a power of 1, the L1 norm. There are many different methods, called model optimization methods, to solve for model parameters that best match data. All are within the scope of the present inventive method.

Stage 2: Inversion for Near-Surface Properties

After the previously described model optimization stage, the resulting model parameters for the different surface-consistent components as a function of frequency can be converted into velocity or attenuation curves. These curves, individually or together, can then be inverted (step 308, discussed further below) for near-surface parameters using any model optimization algorithm, such as least squares, Levenberg Marquardt, quasi-Newton, and simulated annealing. Alternatively, the model expression itself, the transfer functions, or a filtered version of the model parameters may be used. In any case, a near-surface profile is assumed as an initial model, the dispersion curves or other functions are computed using the assumed model and then compared with those determined from the seismic data. Then the profile model is updated to better match the derived parameters, the layer shear wave velocity being one of the model parameters that is adjusted in the iterative updating or optimization process. When the misfit between modeled and seismic derived results is reduced below an acceptable tolerance or other stopping condition is reached, the iterative process is finished and the model parameters including shear wave velocity that are included in the last updated version of the near-surface velocity profile model are the output results of the present inventive method. The term near-surface, as used herein, cannot be precisely defined, but may sometimes be regarded as meaning within one ground-roll wavelength of the surface, which depends on frequency.

Method Steps

Figure 6:
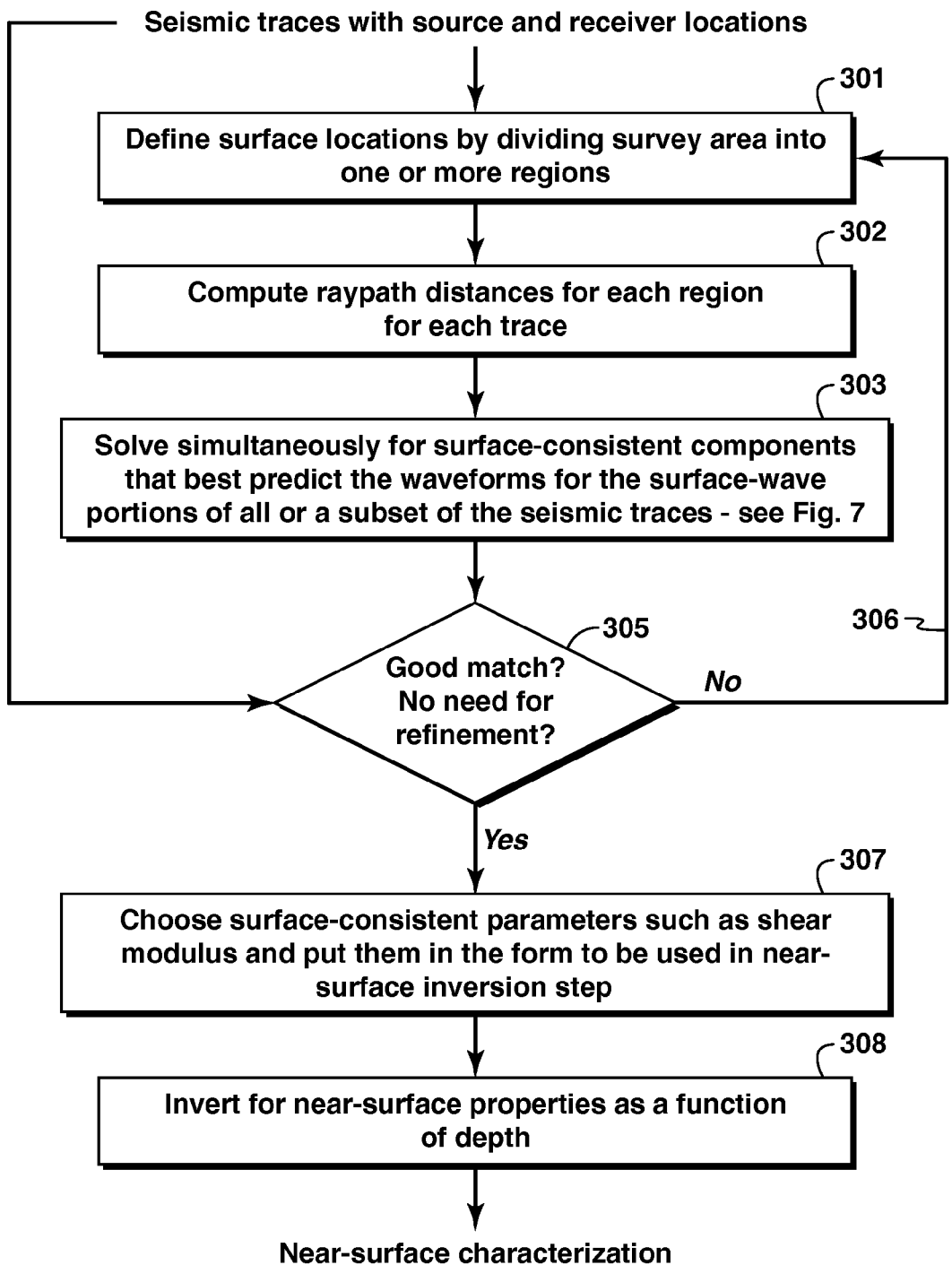
FIG. 6 is a flow chart of basic steps in one embodiment of the present inventive method.

The basic steps in one embodiment of the present inventive method are indicated in the flow chart of FIG. 6. As input, the method requires seismic data traces and the source and receiver locations for each trace. The traces may be single-component or multi-component traces, where here the word component refers to detector units. In step 301, the surface locations for the propagation terms are defined. This can be done by dividing the survey area into one or more regions, such as the cells like 203 in FIG. 5. It may be advantageous to start with big regions, and then subdivide them with later iterations (see step 306). The regions can be regular or irregular. Alternatively, the grid can be chosen from other information, such as geological features, soil types, elevation, or velocity and frequency analyses of the ground-roll modes. In step 302, the raypath distances are computed across each region for each trace and stored for future use. (For practical applications, many or all of the method steps are performed on a computer, having data storage in computer memory or auxiliary storage devices.) It should be sufficient to use a straight ray between source and receiver locations, but if velocity information for the different regions are available from previous iterations, then a bent ray can be used with the trajectory determined by Snell's Law. Any ray tracing tool may be used to compute the raypaths. The raypath distance is the distance along the surface of the earth and could incorporate elevation changes of the surface.

In step 303, all or portions of the seismic trace data are used to simultaneously solve for parameters for two or more surface-consistent components or transfer functions. The solution represents a decomposition of the data into the different components. Each component should represent physical processes that have a filtering or band-limiting effect on the seismic wave, such as source generation or receiver detection effects or propagation through a region of the surface. The source or receiver effects are primarily due to the degree of variable coupling of those apparatus units to the Earth, but include any other effects associated with generation of the seismic energy and its partitioning into a ground roll (surface-wave) mode or with detection of the signal from the ground by the receiver if such effects alter the seismic wavelet. A high degree of uniform coupling of sources and receivers to the ground is always sought, but can never be perfectly achieved. The parameters of the surface-consistent components are not media parameters such as the velocity and density for individual depth layers, but represent for the physical process the changes in the waveform for different frequencies. At a minimum, one source component and one propagation component or two propagation components would be included. For example, a source-type filter evaluated at all source locations for the seismic traces being used, and a propagation-type filter for a certain mode of surface-wave propagation evaluated at all cells crossed by the seismic traces being used. Another minimum example might be to include two propagation-type filters each corresponding to a different mode of surface-wave propagation. The components are determined by the best fit between the surface-wave waveforms in the data and that predicted by a model expression (i.e., a mathematical model for the waveform for surface waves after propagation from a specified source location to a specified receiver location through the cell grid defined in step 301), which includes the above-described parameters. The fit between measured and modeled waveforms is preferably defined by a cost function based on any norm as described above. Any model-optimization method, such as conjugate gradient, steepest decent, or Levenberg-Marquardt, can be used to solve for the model parameters. It is helpful to correct the data for known or approximated physical processes or to include them within the model expression. For example, the instrument response, or the input vibrator wavelet can be included. The solution may (depending upon the model expression) require the picking of an initial set of model parameters, and any a priori information can be used to determine the initial values. It may also be helpful to window, flatten, scale or normalize the data. Furthermore, transforms can be used for the data and the model, and the fit between the data and model compared in the transform domain. It may also be useful to provide weights for different offsets. For example, the higher-frequencies will be missing or attenuated at the longer offsets, and so these offsets might be weighted down in their contribution to the cost function. Depending on the specific optimization method, step 303 can be an iterative optimization process although no loop such as 306 is shown in FIG. 6.

It may be that the optimization in step 303 is limited by the choice of parameterization in step 301. In step 305, the goodness of fit between computed and actual waveforms is evaluated preferably in the time domain and, depending on the goodness of fit, the opportunity to subdivide the regions to obtain more lateral resolution is evaluated. If the match to the data is not deemed sufficient, then the process can be repeated (branch 306) with different parameterization starting at step 301. The goodness of fit may indicate lateral variability, and the regions can be subdivided. In addition, more components can be included, for example, more modes for the surface-waves. Furthermore, corrections can be made for higher-order effects such as bent rays or amplitude focusing, defocusing, transmission loses, and scattering. When step 303 is repeated, the model parameters for previous solutions can be used to derive initial values for the next optimization step.

When in step 305, the optimization is judged to be good and, optionally, if the desired lateral resolution has been obtained, the model parameters are now optimized by the present inventive method and standard methods can be used to compute shear wave velocity and other near surface parameters as indicated in steps 307 and 308. In step 307, the derived parameters are put into a form for near-surface property inversion. For example, the velocity dispersion curves for each mode can be extracted and used for inversion. Alternatively, other functions of the parameters could also be generated. Examples include the composite transfer function, the plane wave solution, or the predicted noise-free waveforms themselves. Other modifications include performing cross-correlations or transforms such as wavelet transform, f-k transform or f-p transforms.

Finally, in step 308, the derived parameters in the desired form are used for near-surface characterization. An assumption is made for the initial near-surface properties such as the shear wave velocity. This may include specifying a number of layers and assigning to each layer a thickness and a property such as the shear wave velocity. Then the form of the derived parameters, i.e. the dispersion curves for each mode, are computed for the initial set of near-surface properties and compared to those generated in step 307. This comparison may involve computing the difference to some power, for example a power of 2 (least squares), between the output of step 307 and the values for the initial near-surface parameters. Then the near-surface parameters are updated to obtain a better match. Standard model optimization algorithms may be used.

Step 303

Next, some of the features of the present invention are described in more detail for an example embodiment of the invention. First, a preferred parameterization of the individual surface-consistent components or transfer functions is described. One starts with a trace with source surface coordinates given by (sx,sy) and the receiver surface coordinates (rx,ry). The raypath between (sx,sy) and (rx,ry) is determined to travel across each region j and the travel distance in region j is $x_j$. Then, the model expression for the vertical component $M_v(f,sx,sy,rx,ry,\vec{T})$ is given by $$M_v(f, sx, sy, rx, ry, \vec{T}) = (aoffset)^{-1/2} S(f) R(f) I(f) \qquad (7)$$
$$C_v(f, rx, ry) \sum_{n=1}^{N} P_{n,v}(f, sx, sy) e^{-i2\pi f \sum_j^{raypath} s_{n,j}(f) x_j}$$

and the corresponding horizontal component $M_h(f,sx,sy,rx,ry,\vec{T})$ is given by $$M_h(f, sx, sy, rx, ry, \vec{T}) = (aoffset)^{-1/2} e^{i\pi/2} S(f) R(f) I(f) \qquad (8)$$
$$C_h(f, rx, ry) \sum_{n=1}^{N} P_{n,h}(f, sx, sy) e^{-i2\pi f \sum_j^{raypath} s_{n,j}(f) x_j}$$

The preceding expressions are for geophones; it is possible to derive similar expressions for other sensors such as accelerometers or hydrophones. In Equations 7 and 8, some components are deterministic, i.e. they can be measured or approximated. The other parameters are unknown and will be obtained by the model optimization of step 303.

Deterministic Components:

$(aoffset)^{-1/2}$—Amplitude Spreading Factor or divergence correction for a surface wave traveling along a 2D surface (Berkholt, *Applied Seismic Wave Theory*, Elsevier Science Publishers, p. 142 (1987)). The quantity aoffset is the absolute value of the total source to receiver distance given by $\sqrt{(sx-rx)^2+(sy-ry)^2}$.

S(f)—Source Wavelet in frequency domain: This is an average or characteristic wavelet for the entire survey. Methods to measure it are described below.

R(f)—Receiver Impulse Response in frequency domain: This can be obtained from the manufacturer. It represents the average response of the sensors, but if individual sensitivity curves have been measured, they can be used.

I(f)—Recording System Impulse Response in frequency domain. This can be obtained from the manufacturer or measured by injecting a spike voltage into the input of the recording system.

$e^{i\pi/2}$—90° phase rotation for horizontal component.

Unknown Components:

$C_v(f,rx,ry)$ or $C_h(f,rx,ry)$—Receiver Coupling for vertical or horizontal sensor, respectively at receiver surface position (rx,ry). This term represents both the variation in sensor sensitivity and the receiver coupling to the ground at location (rx,ry). The receiver or geophone coupling can be described as a complex transfer function (Krohn, "Geophone Ground Coupling", *Geophysics* 49, 722-731 (1984)). It can also include an array effect, which could require a source-receiver azimuth dependence. In this implementation it is assumed to be independent of modes, but a receiver coupling term that varies with mode could be used.

$P_{n,v}(f,sx,sy)$ or $P_{n,h}(f,sx,sy)$—Source Coupling and Partition into Mode n for vertical and horizontal sensors, respectively. This is an important lumped parameter. It includes source to source variations and source coupling at location (sx,sy). It also includes the amplitude partition of the source energy into each mode. Each mode can be thought of as an interference of plane-waves traveling within a layered structure forming a waveguide. The layering will selectively propagate different frequencies, and so each mode will have a different amplitude spectrum. Furthermore, the fundamental mode will start at zero frequency, but there will be increasing cut-on frequencies for subsequent modes. (Aki and Richards, *Quantitative Seismology: Theory and Methods Volume I*, W. H. Freeman and Co., 259-318 (1980)). Differences for horizontal and vertical components give rise to different polarization for the different modes.

$s_{n,j}(f)$—Complex slowness for Propagation Across Region j for Mode n. The complex slowness is multiplied by the raypath distance $x_j$ across the cell j. In this implementation, the slowness is made independent of azimuth or direction of propagation. If there is sufficient anisotropy at the site, then an azimuth dependence could be implemented.

The exponential term in equations 7 and 8 is of the form of plane wave propagation $e^{ikx}$ where k is the complex wavenumber (Aki and Richards, op. cit., 173.). The wavenumber k can be written as $$k = \frac{2\pi f}{v'} \text{ where } \frac{1}{v'} = \frac{1}{v} + \frac{i}{2vQ}$$

and Q is the effective attenuation quality factor. For each region j, a slowness term $s_{n,j}(f)$ is defined, which includes a real part, the inverse of the phase velocity $v_n(f)$ for surface mode n, and an imaginary part related to the frequency dependent quality factor $Q_n$:

$$\text{real}(s_{n,j}(f)) = \frac{1}{v_n(f)}, \text{ imag}(s_{n,j}(f)) = \frac{1}{2Q_n(f)v_n(f)}. \quad (9)$$

The complex slowness is thus a parameter for each propagation components for each region j in Equation 7 and 8.

The current invention solves for the region-dependent earth filter. To fully account for the earth filtering effects on the surface-wave waveform, both velocity and attenuation parameters are preferably included as a function of frequency. Furthermore, for more than one mode, the phase and amplitude effects are coupled and cannot be solved for independently. A vertical profile of the earth velocity or attenuation is not required nor is it estimated at this stage. Instead, only the frequency dependence of both velocity and attenuation is found. Once it is found, then it can be used in step 308 to determine the velocity and attenuation profile.

The ability to approximate the source wavelet S(f) in Equations 1, 4, 5, 7 and 8 can make the model optimization step more robust. In the literature, authors discuss problems and difficulties in knowing the phase of the source wavelet, particularly for vibratory sources (Ziolkowski, "Why don't we measure seismic signatures," *Geophysics* 56, 190-201 (1991); and Gibson and Lamer, 1984, "Predictive deconvolution and the zero-phase source," *Geophysics* 49, 379-397 (1884)) Because of these perceived difficulties, a source term has not been included in ground-roll velocity estimation problems and the transfer function approach (Eq. 1) has not been used for ground-roll mitigation. For example, in both previously cited Ernst et al. papers, a source term is not included in the first solution for a phase velocity field.

These difficulties may be handled in the present invention by methods to approximate a source wavelet, and by the source coupling and partition term described above. The source coupling term corrects for the inadequacies in the approximation of the source wavelet. Trantham ("Controlled-phase acquisition and processing," *Soc. Explor. Geophy. Expanded Abstracts* 13, 890 (1994)) showed that the acquisition wavelet can be controlled. Furthermore, Krohn (PCT Patent Application Publication No. WO2004/095073) teaches a method to process vibrator data by deconvolving by a vibrator signature based on measurement on the vibrators and shaping the data to a desired impulse response or a wavelet. The vibrator processing wavelet constructed by the method of Krohn is a preferred wavelet to use in this invention for vibroseis data. Alternately, the autocorrelation of the sweep can be used. For data generated with an air gun array, the far-field signature of the air gun can be used. The far-field signature can be measured or it can be modeled from the responses of the individual air guns. Finally, for dynamite data or other data without a source signature, a source wavelet can be constructed using near-offset traces by computing the cross-power spectrum or auto-power spectrum for a time window around the first breaks. The square root of the power spectrum is used as the amplitude of the wavelet. The phase spectrum equivalent to minimum phase for that amplitude spectrum can be computed by standard methods. One method is to obtain the phase by computing the Hilbert transform method of the logarithm of the wavelet amplitude spectrum.

The above unknown components are represented as functions of frequency. The values of these components are estimated for each frequency over the all the frequencies in the ground-roll. Since the ground-roll is band limited and low frequency, the frequency range that needs to be covered is small, for example from 3 to 25 Hz. One way to solve for the unknown components is to solve for the individual frequency values independently, i.e., one frequency at a time. In this embodiment of the invention, the individual parameters for each frequency are the source partition amplitude and phase, the receiver coupling amplitude and phase, and the phase slowness real and imaginary parts. A problem with this approach is that the solution for one frequency may be very different from the next frequency, particularly at the edges of the band when the amplitudes are small. A preferred approach is to constrain the optimization steps so that the components are a smooth function of frequency. One way to do this is to solve not for the individual frequency values but for the coefficients of a polynomial or spline curve that represents the components (see the previously cited Ernst et al. articles). In this case, the inversion is performed simultaneously over a range of frequencies. Another way to reduce the number of unknowns is to link velocity and attenuation parameters by using a causality constraint.

Figure 7:
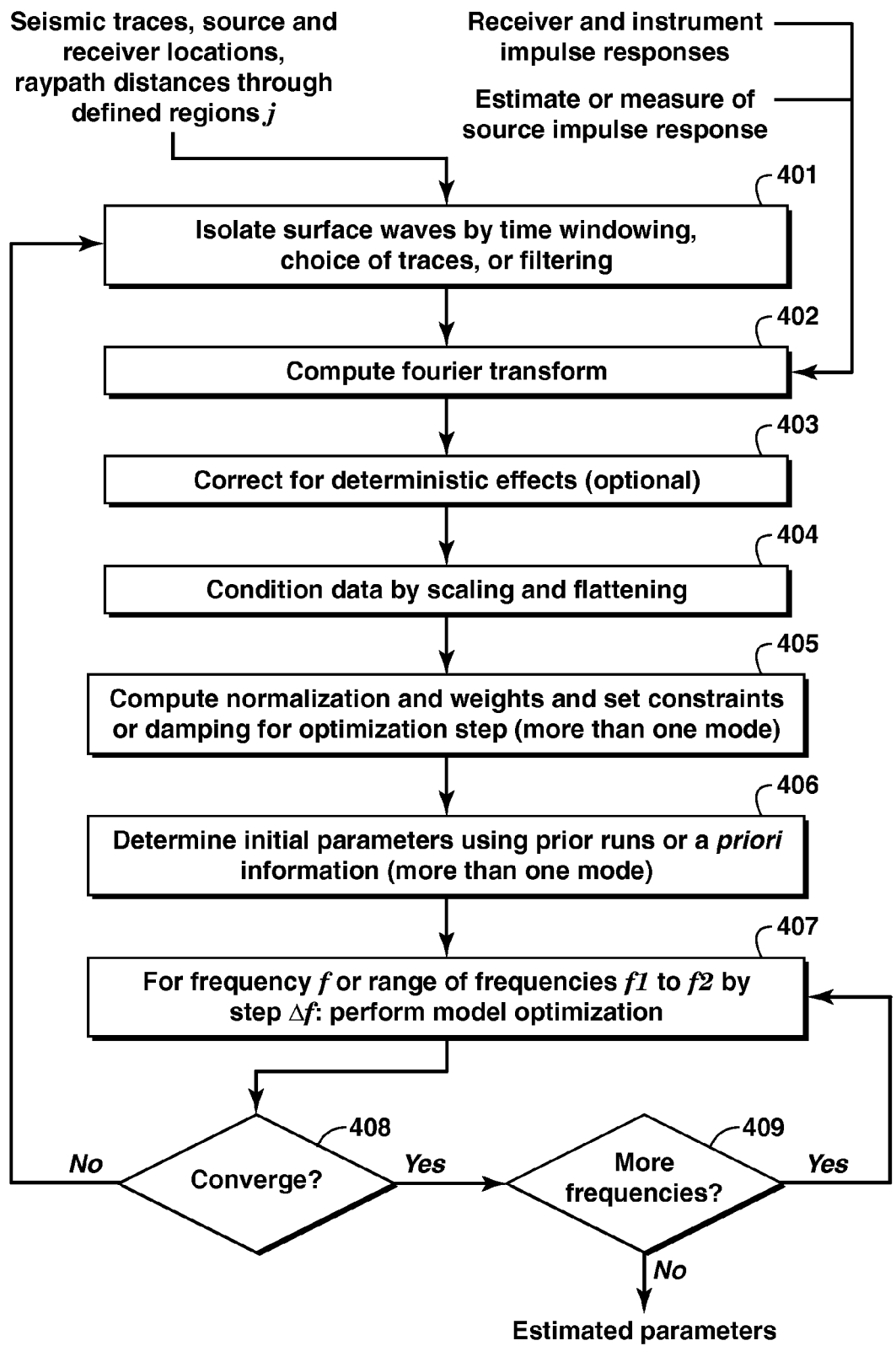
FIG. 7 is a flow chart of steps for performing the model optimization part of FIG. 6 in one embodiment of the invention, wherein surface consistent components (transfer functions) governing surface wave propagation are generated.

A preferred way to perform step 303 is now described and detailed in FIG. 7. In this implementation, the inputs to the solution step 303 are the seismic traces with source and receiver locations and the path lengths across each region for each trace. In addition, as part of step 303, measurements or approximations of the recording system, the sensor, and the source impulse responses (wavelet) are obtained. The method may be used for only vertical traces, for only horizontal traces, or for both together. An expression may also be derived for pressure sensors or accelerometers, as well.

In step 401 of FIG. 7, the surface-waves are isolated by a time window. The purpose is to limit the interference from other events such as reflections or first arrivals. Also the offset range or the traces to be used can be limited. The longer offsets may be missing high frequencies and tests may reveal that they are less useful. Also, the small offsets may be not useful because they are in the near field of the source. Other methods of isolating or enhancing the surface-waves can be used such as filtering, cross-correlating with a reference trace, interferometric operations of cross-correlating and stacking, etc.

In step 402, the data and the supplied impulse responses are Fourier transformed into the frequency domain. Alternatively, the data can be left in the time domain or transferred into some other domain. For example, f–k domain, wavelet domain, Gabor domain, or radon domain.

In step 403, the data traces in the frequency domain Do are divided by the deterministic components ((aoffset)$^{-1/2}$, S(f), I(f), and R(f), e$^{-\pi/2}$) and stored as D'(f). This is optional; the purpose is to avoid multiplying by these terms each time the model traces Eq. 7 and Eq. 8 are computed.

Now Equations 7 and 8 can be written with the known parameters removed $$M'_v(f, sx, sy, rx, ry, \vec{T}) = \quad (10)$$

$$C_v(f, rx, ry) \sum_{n=1}^{N} P_{n,v}(f, sx, sy) e^{-i2\pi f \sum_j^{raypath} s_{n,j}(f) x_j}$$

and $$M'_h(f, sx, sy, rx, ry, \vec{T}) = \quad (11)$$

$$C_h(f, rx, ry) \sum_{n=1}^{N} P_{n,h}(f, sx, sy) e^{-i2\pi f \sum_j^{raypath} s_{n,j}(f) x_j}.$$

In step 404, it is helpful to further condition the data and the parameters. It is useful to flatten the data using a single value of the average ground-roll slowness $s_0$ or inverse velocity. The data are multiplied by the phase term $e^{i2\pi(offset)s0}$ to flatten the data, and all slowness parameters are adjusted appropriately. Furthermore it is helpful to use distance units of 10 km and to scale the amplitudes of the data so that all the unknown parameters have similar numerical values, i.e. in the range of 1-10, so that the model optimization step can better update each one. Other ways of data regularization may be advantageous.

When there is one mode, the model optimization step is linear; when there is more than one mode it is nonlinear. As those familiar with model optimization know, a nonlinear optimization may need constraints or damping terms (Step 405) and an initial set of parameters (Step 406). It is useful to constrain the source and receiver coupling amplitudes to be positive numbers. Also, to keep the cost function from being too small initially, it is helpful to normalize the cost function at each frequency by dividing it by the average rms amplitude of the data traces. Furthermore, as discussed above it may be preferable to apply damping or to re-parameterize the components as splines so that the components are smoothly varying with frequency. Weights for the different offsets or trace amplitude normalization may also be useful. It may be preferable to make the longer offsets more important by, for example, dividing the cost-functions by the square root of offset. The higher-order modes are more dominant on longer offsets, so a mode-dependent offset weighting could be useful. If the amplitudes of the traces in the survey are highly variable, the cost functions can be normalized using the trace amplitudes to make all traces contribute more equally to the solution. The initial values (step 406) can be set using measurements made on the data using f–k analysis or other measurements or information. If the optimization step is being repeated, then the previous values can be used.

The optimization step 407 is done one frequency at a time or one group of frequencies at a time. Specific methods of implementing step 407 are described below. At the end of each group, the size of the total residue (the value of the cost function) is evaluated to determine whether or not there has been a convergence to a solution (Step 408). If not then new values may be picked for offset range, scaling, normalization, etc. If a good solution has been obtained, then the optimization is done for more frequency groups (Step 409).

Step 407: One Mode Solutions

When there is only one mode of ground roll, a determination that the skilled practitioner will be able to make from the seismic data, then the optimization problem is linear with respect to the parameters, and the amplitude and phase components can be separated and solved for independently. Even when there is more than one mode, it may be useful to try the one-mode solution to help set the initial parameters, particularly at the low-frequencies before the cut-on frequency of the higher order modes. When there is only one mode, then Equation 8 becomes $$M'_v(f, sx, sy, rx, ry, \vec{T}) = \quad (12)$$

$$C_v(f, rx, ry) P_v(f, sx, sy) e^{-i2\pi f \sum_j^{raypath} s_j(f) x_j}.$$

A similar expression can be generated for the other components, i.e. transfer functions. Because there is no sum over the modes, the amplitude and phase components can be separated and solved for independently. Using A for amplitude and taking the logarithm of the amplitudes and Φ for phase and unwrapping the phase, one gets the following:

$$\log A(M'_v(f, sx, sy, rx, ry, \vec{T})) = \log A(C_v(f, rx, ry)) + \quad (13)$$

$$\log A(P_v(f, sx, sy)) + \left(2\pi f \sum_j^{raypath} imag(s_j(f)) x_j\right)$$

$$\Phi(M'_v(f, sx, sy, rx, ry, \vec{T})) = \quad (14)$$

$$\Phi(C_v(f, rx, ry)) + \Phi(P_v(f, sx, sy)) - \left(2\pi f \sum_j^{raypath} real(s_j(f)) x_j\right)$$

The cost term for the amplitude and phase terms becomes:

$$\sum_{i=1}^{ntraces} \left|\log(A(D_i(f, sx, sy, rx, ry))) - \log(A(M'(f, sx, sy, rx, ry, \vec{T})))\right|^2 \quad (15)$$

$$= \min$$

$$\sum_{i=1}^{ntraces} \left|\Phi(D_i(f, sx, sy, rx, ry)) - \Phi(M'(f, sx, sy, rx, ry, \vec{T}))\right|^2 = \min \quad (16)$$

The solution can be obtained using standard linear techniques, such as matrix inversion, conjugate gradient methods, or singular value decomposition. With only one region and neglecting the receiver coupling terms, then linear regression can be used to solve for the amplitude and phase parameters of the source and the one region.

Step 407: Multi-Mode Solutions

When there is more than one mode then the optimization step is non-linear. The amplitude and phase terms are coupled and cannot be separated. In this case, one may assume a particular number of modes (two or more) and use the full cost function based on the real and imaginary parts of the data given by Equation 6. The goal is to solve for the full multi-mode vector $\vec{T}$ (f). Since the problem is non-linear, a non-linear optimization code such as Levenberg Marquardt, steepest decent or a Newton method, is required. The Levenberg-Marquardt method may be preferred; it is fast and stable. It is particularly helpful to supply analytical forms of the derivatives of the cost function or the Jacobian. These methods are iterative. They require an initial model, and the solution iteratively updates the model to improve the match with the data. All of these iterations are within the step 303 in the flow chart of FIG. 6. It may be useful to start with a small number of modes, solve the solution for the smaller number of modes, then to branch (306) back to the beginning, use the parameters previously determined and add new parameters for the higher-order modes for the next solution of step 303. The whole process can be repeated as many times as needed to obtain a best match to all modes of the surface wave.

EXAMPLES

A couple of examples of the estimation of velocity dispersion and attenuation curves are shown here. These are examples for computer simulated data using a full 3D viscoelastic wave-equation solution for flat layers. The simulation was performed with a 20-Hz Ricker source wavelet. Because the model is of flat layers, there is no lateral variation in soil types, so there is only one region, which requires only one source. Also, there are no receiver coupling variations. In this case, the parameterization reduces to the source and propagation terms for each mode. This means that two components (also called transfer functions or filters) will be used in these examples, both of them complex quantities. In the case of lateral heterogeneity, however, the preferred method would be to use multiple sources.

Figure 8:
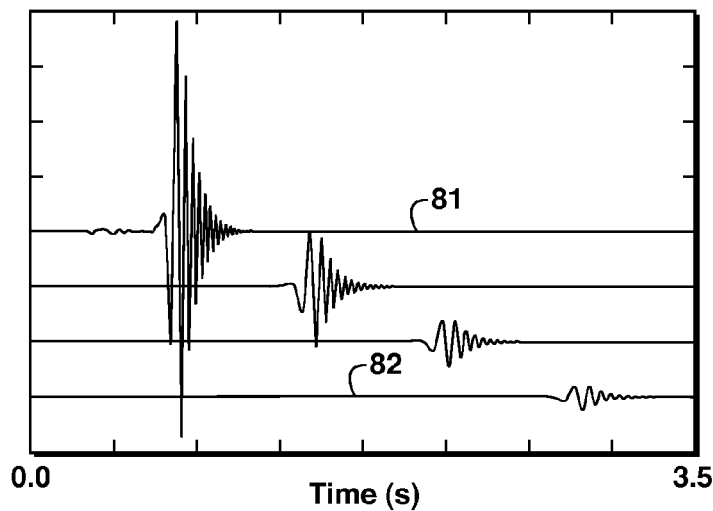
FIG. 8 shows four traces for four source-to-receiver distances (offsets) for a full wave-equation computer simulation of surface waves for a single thin earth layer over a half space.
Figure 9A:
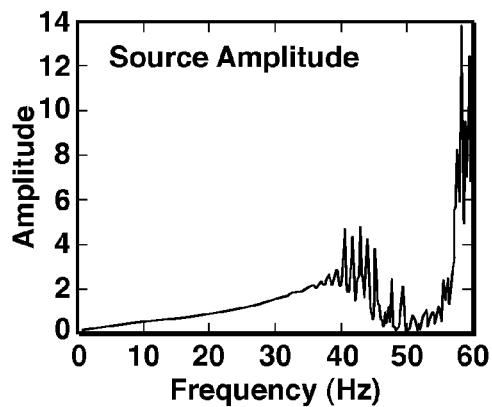
FIGS. 9A-D show the result of model optimization for the example of FIG. 8 wherein the waveform changes have been decomposed into complex (amplitude and phase) source and propagation components as a function of frequency.
Figure 9C:
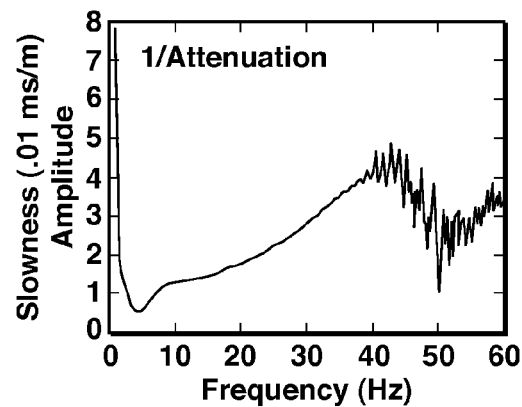
Figure 9B:
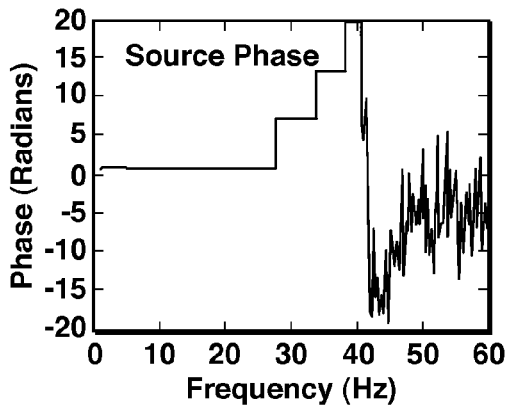
Figure 9D:
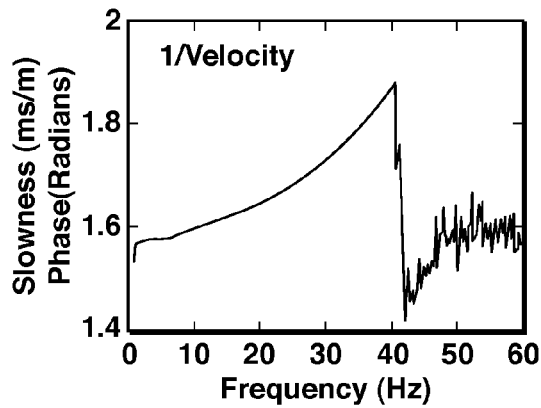
Figure 10:
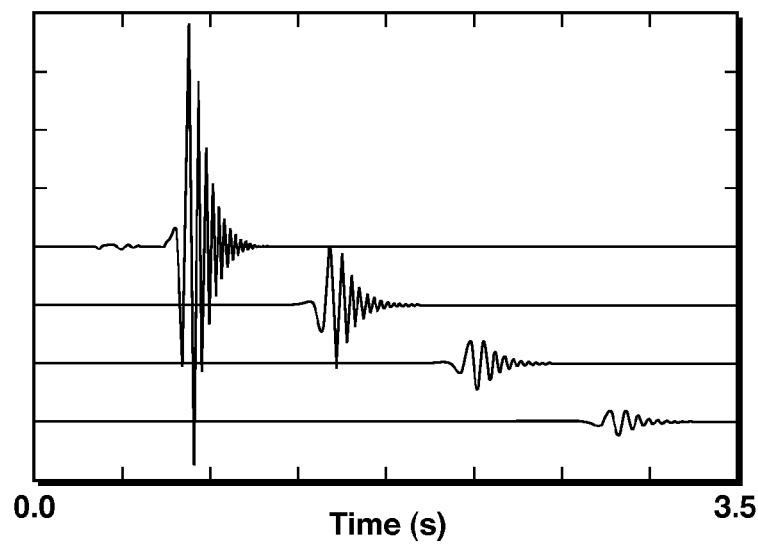
FIG. 10 shows the predicted waveform output computed from the components of FIGS. 9 A-D; the waveforms can be compared to the input seismic data of FIG. 8.

The first example is a single 5-m thin layer over a half space. There is only one surface-wave mode, which is dispersive, as shown in FIG. 8 for four source-to-receiver distances (offsets) ranging from 500 m (81) to 2,000 m (82) in 500 m increments. These represent a few traces from the seismic data input for step 301. The outputs of the model optimization step 303 are shown in FIGS. 9A-D. These include the source partition (i.e. the part of the source energy that goes into surface waves rather than the body waves that provide seismic reflections) amplitude (9A) and phase (9B) and the real (9C) and imaginary (9D) parts of the slowness. Each of these parameters is a function of frequency. It may be noted also that the source partition parameter is not the 20-Hz Ricker wavelet, but is the correction for partition into the ground-roll mode. Predicted ground-roll waveforms are computed using the optimized parameters from step 303, and are shown in FIG. 10. They may be compared to the input data of FIG. 8. They are a perfect match to the surface-wave part of the data.

Figures 11A, 11B:
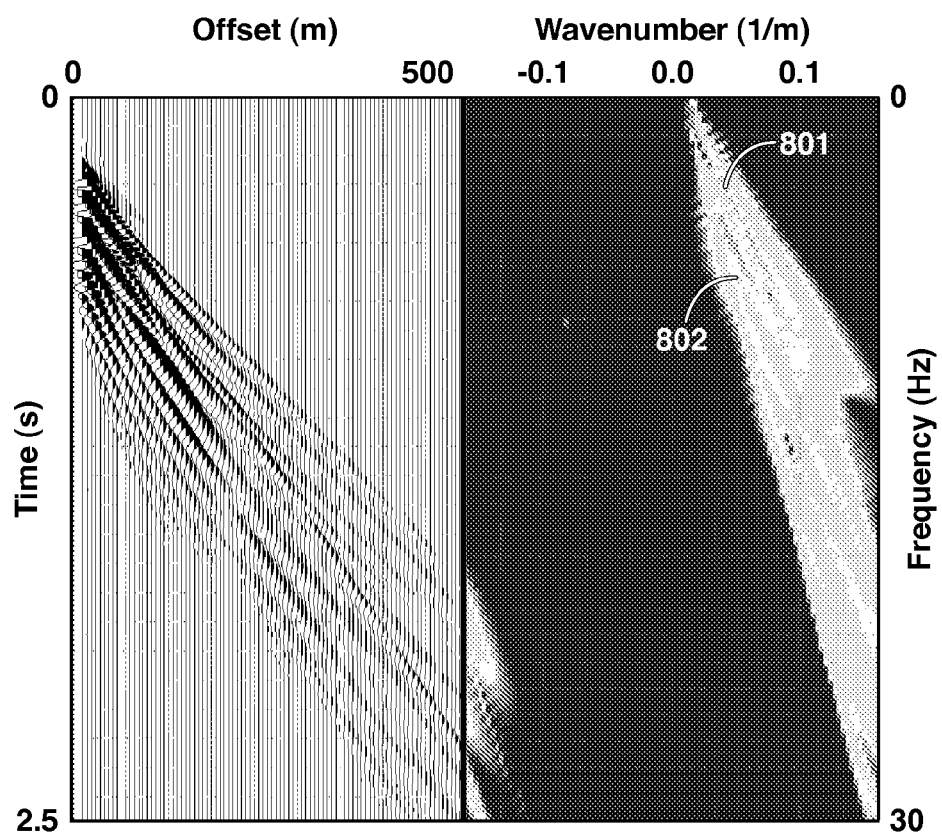
FIGS. 11A-B show the trace data (11A) and f–k spectrum (11B) for a full wave-equation computer simulation of surface waves for 20 thin earth layers over a half space, wherein interference of up to 6 ground-roll modes can be seen.

The second example is a simulation from a complex near-surface with a large velocity gradient composed of 20 layers. The waveforms (FIG. 11A) show complicated interference of multiple modes and the f-k spectra resulting from a 2D Fourier transform of the data (FIG. 11B) indicate the presence of up to 6 modes with their own velocity dispersion and amplitude behavior. The slowest mode or fundamental mode 801 starts at 0 Hz, but subsequent modes have increasing cut-on frequencies. The cut-on frequency for the $3^{rd}$ mode is marked as 802. The velocities and amplitudes were picked on the f-k spectra and were used as initial models. The linear method was used for the first mode, and then subsequent solutions were performed with the nonlinear method adding two modes at a time.

Figure 12:
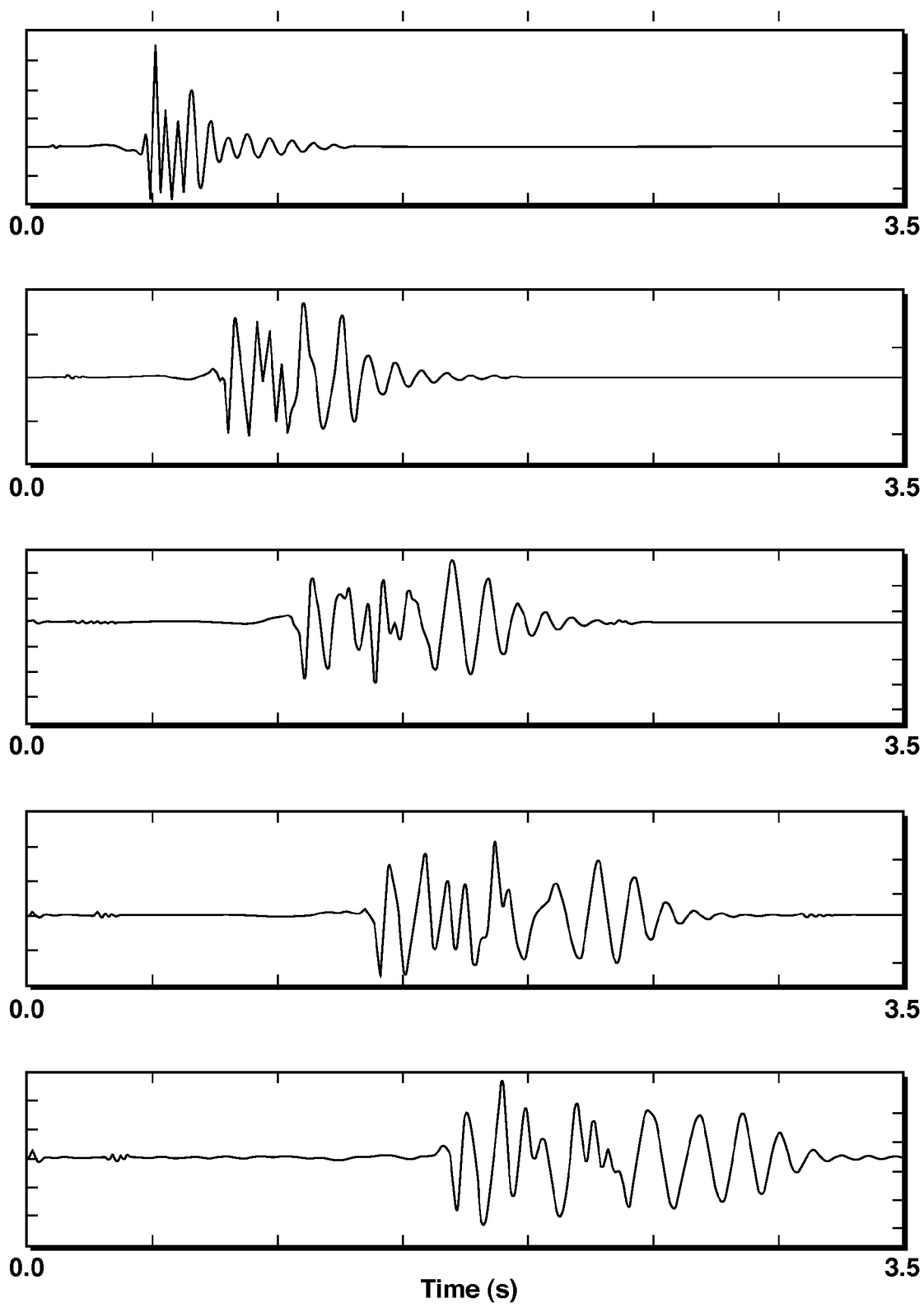
FIG. 12 shows selected waveforms for a few offsets (trace to receiver distance) from the trace data of FIG. 11A; the waveforms do not have a simple form but are composed of the superposition of multiple modes.
Figure 13:
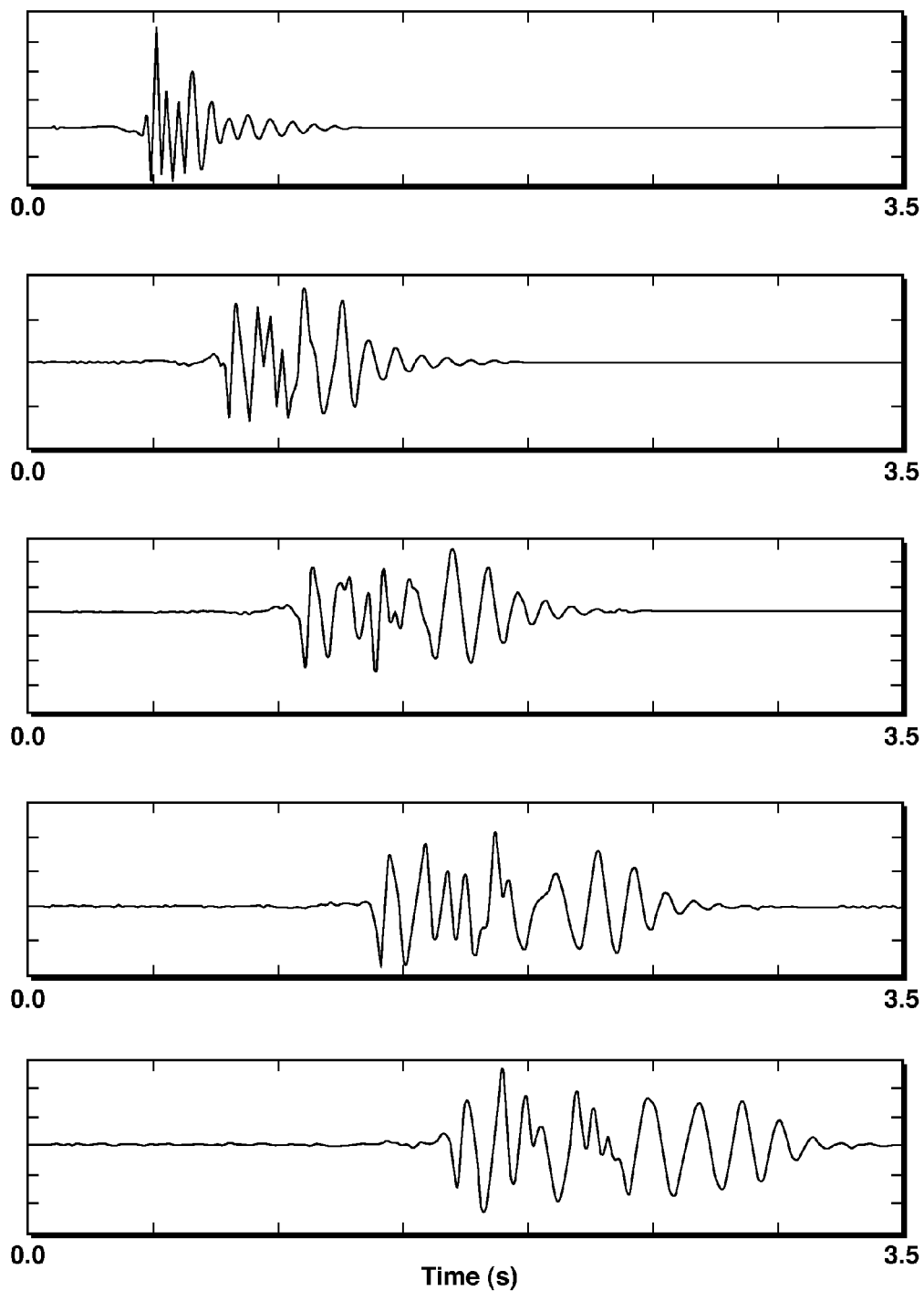
FIG. 13 shows the predicted waveform output for the same offsets shown in FIG. 12; the parameters for 6 modes are used in this prediction.
Figure 14:
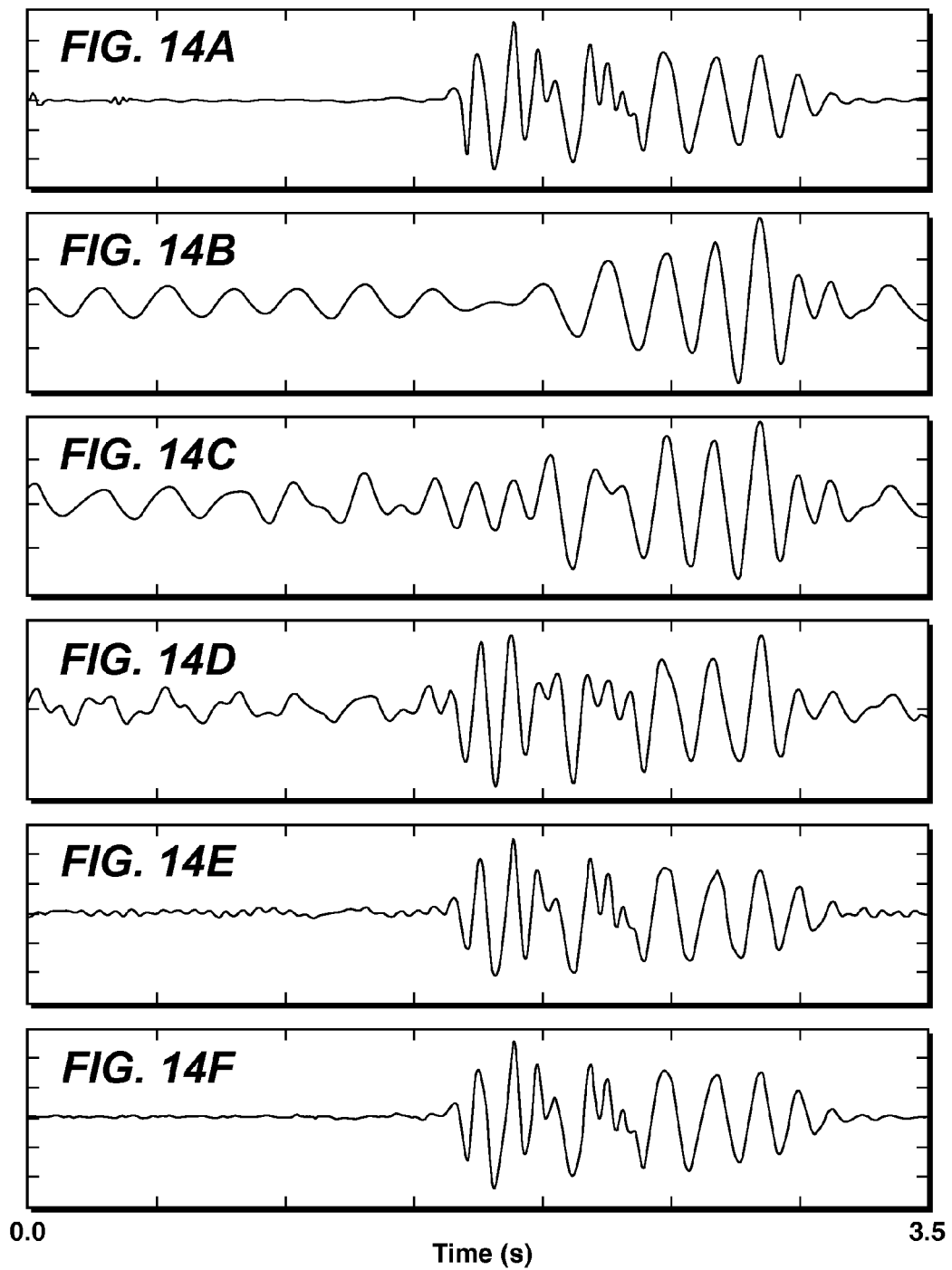
FIGS. 14A-F show one data trace (14A) from FIG. 12, and predictions in which the predicted waveform output has been limited to one (14B,) two (14C) three (14D), four (14E) and six (14F) modes; inclusion of more modes improves the match to the data trace (14A)
Figure 15:
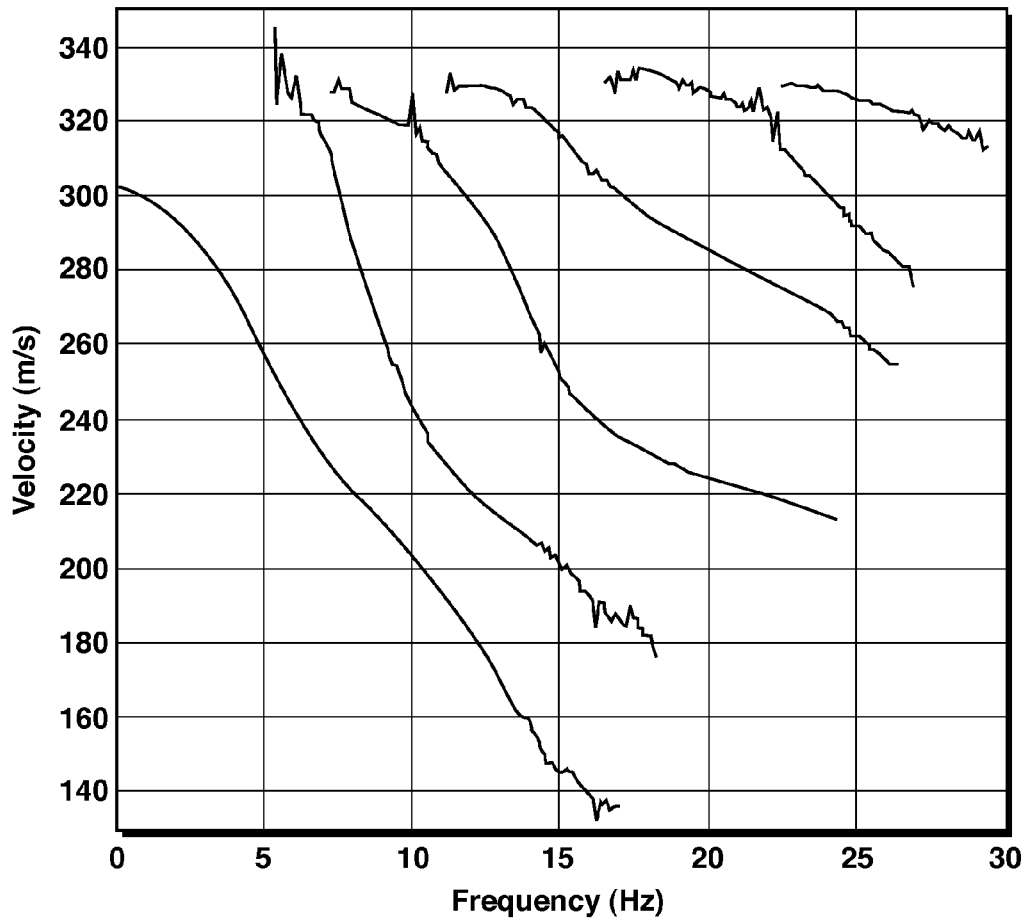
FIG. 15 displays velocity dispersion curves (velocity as a function of frequency) for the 6 different ground roll modes of FIGS. 11A-B as calculated by the present inventive method.

FIG. 12 shows the original data traces for five offsets ranging from 100 m (top) to 500 m (bottom) in equal 100 m increments, and FIG. 13 shows the predicted waveforms for the five traces. They are an excellent match. The waveforms illustrate the complexity of the waveforms and the interference of multiple modes. The model expression with six modes is able to reproduce the full complexity of the waveforms. It takes a multiple mode solution to accurately represent the waveforms. FIGS. 14A-F show the comparative effect of inclusion of one, two, three, four and six modes in computing predicted waveforms. FIG. 14A shows one data trace and FIGS. 14B-F show predictions of that data trace using one (14B), two (14C), three (14D), four (14E) and six (14F) modes. Including only one mode matches the back, slower part of the waveform. Four modes are a good match, and six modes match very well. Finally, FIG. 15 shows the output of step 307, the velocity dispersion curves for six modes of ground-roll. These curves can be input into step 308 for near-surface characterization.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for transforming seismic data traces corresponding to at least one source position and a plurality of receiver positions in a seismic survey of a subsurface region into a near-surface earth model of elastic shear wave propagation velocity or other physical property of the earth derivable therefrom including shear modulus, said method comprising: (a) dividing a near surface part of the subsurface region into one or more cells, and computing source-to-receiver ray path distances for each cell for a plurality of the seismic data traces; (b) using the ray path distances, simultaneously solving, using a computer, for at least two types of surface-consistent components of the seismic traces, as functions of x and y location and frequency, wherein a surface-consistent component characterizes filtering effects either of propagation of a seismic surface wave mode across a cell (a propagation filter), or due to generation of surface wave energy at a source location (a source filter) or due to receiving of source wave energy at a receiver location (a receiver filter), and wherein a "type" of surface-constant component is one of (i) a propagation filter for one surface wave mode, evaluated at all cells crossed by any of the seismic traces; (ii) a source filter, evaluated at all source locations for the seismic traces, or (iii) a receiver filter, evaluated at all receiver locations for the seismic traces; and (c) choosing one or more of the surface-consistent components, and using them to compute by numerical inversion, using a computer, a near-surface earth model of shear wave velocity or other physical property of the earth derivable therefrom as a function of (x,y,z) location.

2. The method of claim 1, further comprising for some or all of the traces and corresponding seismic source and receiver locations, computing the raypath distance across each intervening cell from the source location to receiver location, and wherein the solution for surface-consistent components optimizes said components by a single comparison or iterated comparisons of data traces from the seismic survey and surface-wave predictions computed using assumed or iteratively updated components along with the computed raypath distances.

3. The method of claim 2, further comprising repeating steps (a)-(b) at least once, wherein the cell division in (a) is changed to improve consistency between predicted and survey data waveforms.

4. The method of claim 1, wherein the components for each trace consist of a source component, a receiver component, and a component for each cell crossed in the raypath from the source to the receiver.

5. The method of claim 1, wherein at least two distinct modes are identified in the seismic data, and the surface-consistent components include parameters for multi-mode propagation of surface-waves.

6. The method of claim 5, wherein the distinct modes are identified from the data after the data are transformed into a frequency domain or a frequency-wavenumber domain.

7. The method of claim 1, wherein the surface-consistent components are also a function of azimuth or propagation direction.

8. The method of claim 1, wherein the surface-consistent components include parameters for velocity dispersion or attenuation.

9. The method of claim 1, wherein the numerical inversion is performed in (c) by minimizing a cost function involving the sum over a group of traces of the difference between a model expression, which is a function of said surface-consistent components, and the survey data.

10. The method of claim 1, wherein a model optimization algorithm is used in solving for said surface-consistent components, wherein the model is a model of a waveform for either a single ground roll mode or for multiple modes.

11. The method of claim 1, wherein solving for said surface-consistent components involves using one or more of constraints, damping, normalization, weights, and regularization.

12. The method of claim 1, wherein (c) comprises using said surface-consistent components to compute a surface wave waveform for comparison to corresponding recorded seismic data.

13. The method of claim 2, wherein the inversion in (c) is a nonlinear optimization problem in which the model is a near-surface velocity profile model, and parameters of the model include at least layer depths and layer shear modulus for near surface layers, and the inversion extracts velocity dispersion curves for each surface wave mode from the optimized surface-consistent components and compares them to velocity dispersion curves predicted by said velocity profile model.

14. The method of claim 1, wherein the seismic data are conditioned by windowing, by filtering, by cross-correlation filtering, or by cross-correlation, then followed by stacking or by transforming the data into a domain other than the space-time domain in which the data were recorded.

15. The method of claim 1, wherein the seismic data traces used correspond to a plurality of survey source locations, with each source impulse being recorded by a plurality of receivers.

16. The method of claim 1, wherein at least one of the surface-consistent components is a transfer function in frequency domain or an impulse response in time domain.

17. The method of claim 1, wherein the surface-consistent components are complex functions of frequency, i.e. functions having a real part and an imaginary part.

18. The method of claim 17, wherein the complex surface-consistent components include source amplitude and phase, and a complex slowness for each cell crossed by the trace raypath and for each ground-roll mode being treated.

19. The method of claim 1, further comprising using a computed near-surface earth model of shear modulus from (c) for engineering or design of improvements in or on the subsurface region.

20. The method of claim 1, further comprising using a computed near-surface earth model of shear wave velocity from (c) for hydrocarbon assessment of, or extraction of hydrocarbons from, the subsurface region.

21. A method for producing hydrocarbons from a subsurface region, comprising:
(a) obtaining a seismic image of the subsurface region including s-wave seismic data, wherein traces from the s-wave data were processed for imaging using shear wave modulus values obtained using a method comprising:
dividing a near surface part of the subsurface region into one or more cells, and computing source-to-receiver ray path distances for each cell for a plurality of the seismic data traces;
using the ray path distances, simultaneously solving, using a computer, for at least two types of surface-consistent components of the seismic traces, as functions of x and y location and frequency, wherein a surface-consistent component characterizes filtering effects either of propagation of a seismic surface wave mode across a cell (a propagation filter), or due to generation of surface wave energy at a source location (a source filter) or due to receiving of source wave energy at a receiver location (a receiver filter), and wherein a "type" of surface-constant component is one of (i) a propagation filter for one surface wave mode, evaluated at all cells crossed by any of the seismic traces; (ii) a source filter, evaluated at all source locations for the seismic traces, or (iii) a receiver filter, evaluated at all receiver locations for the seismic traces; and
choosing one or more of the surface-consistent components, and using them to compute by numerical inversion, using a computer, a near-surface earth model of shear wave modulus as a function of (x,y,z) location; and
(b) drilling a well into the subsurface region based at least in part on the seismic image from (a), and producing hydrocarbons from the well.

22. A method for determining a near-surface earth model of elastic shear-wave propagation velocity from seismic data traces, comprising for a plurality of the traces computing source-receiver ray path distances and using them to simultaneously solve for at least two surface-consistent transfer functions in x-y-frequency domain, or impulse responses in x-y-time domain, that represent changes in seismic surface wave waveforms as they propagate from source to receiver, computing one or more velocity dispersion curves from the surface-consistent transfer functions or impulse responses, and numerically inverting the one or more velocity dispersion curves to compute a near-surface earth model of elastic shear-wave propagation velocity as a function of (x,y,z) location, wherein the computing, simultaneously solving, and numerically inverting are performed using a computer.

23. The method of claim 1, further comprising isolating surface waves in the seismic data traces by time windowing, choice of traces, or filtering, and using the surface waves in (b).

* * * * *